United States Patent
Zhang et al.

(10) Patent No.: US 12,047,388 B2
(45) Date of Patent: Jul. 23, 2024

(54) HARDWARE DETECTION METHOD AND APPARATUS, DEVICE, AND STORAGE MEDIUM

(71) Applicant: Huawei Technologies Co., Ltd., Shenzhen (CN)

(72) Inventors: Mengnan Zhang, Shenzhen (CN); Lizhong Qiao, Beijing (CN); Haiwu Chen, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 308 days.

(21) Appl. No.: 17/581,212

(22) Filed: Jan. 21, 2022

(65) Prior Publication Data

US 2022/0150260 A1    May 12, 2022

Related U.S. Application Data

(63) Continuation of application No. PCT/CN2020/101699, filed on Jul. 13, 2020.

(30) Foreign Application Priority Data

Jul. 24, 2019   (CN) .......................... 201910673176.6

(51) Int. Cl.
  *H04L 9/08* (2006.01)
  *H04L 9/32* (2006.01)
  *H04L 9/40* (2022.01)

(52) U.S. Cl.
  CPC .............. *H04L 63/12* (2013.01); *H04L 9/08* (2013.01); *H04L 9/3247* (2013.01);
  (Continued)

(58) Field of Classification Search
  CPC ...... G06F 21/54; G06F 21/554; G06F 21/566; G06F 21/577; G06F 21/64; G06F 21/44
  See application file for complete search history.

(56) References Cited

U.S. PATENT DOCUMENTS 8,516,269 B1 *  8/2013  Hamlet ................. G06F 21/445
                                                          713/180
8,667,265 B1    3/2014  Hamlet et al.
(Continued)

FOREIGN PATENT DOCUMENTS

CN    101464932 A    6/2009
CN    101464932 A *  6/2009   ............. G06F 21/34
(Continued)

OTHER PUBLICATIONS

"ARM Security Technology, Building a Secure System using TrustZone Technology," PRD29-GENC-009492C, Copyright 2005-2009 ARM Limited, 108 pages.
(Continued)

*Primary Examiner* — Carl G Colin
*Assistant Examiner* — Habibullah
(74) *Attorney, Agent, or Firm* — Conley Rose, P.C.

(57) ABSTRACT

A hardware detection method includes sending first verification data to a physical carrier, where the physical carrier carries a plurality of pieces of hardware; receiving a ciphertext and binding relationship information from the physical carrier, where the ciphertext is obtained after at least two of the pieces of hardware respectively encrypt the first verification data using respective keys, and where the binding relationship information indicates a binding relationship between the at least two pieces of hardware; verifying the ciphertext and the binding relationship information; and determining security of the at least two pieces of hardware based on a verification result.

20 Claims, 13 Drawing Sheets

(52) U.S. Cl.
CPC .......... *H04L 9/3263* (2013.01); *H04L 9/3278* (2013.01); *H04L 63/0428* (2013.01); *H04L 63/0876* (2013.01)

(56) References Cited

U.S. PATENT DOCUMENTS

| | | | | |
|---|---|---|---|---|
| 2005/0039016 | A1* | 2/2005 | Aissi | H04L 63/0823 713/176 |
| 2006/0082609 | A1* | 4/2006 | Walmsley | B41J 2/04573 347/14 |
| 2009/0254749 | A1* | 10/2009 | Li | G06F 21/34 713/169 |
| 2009/0319802 | A1* | 12/2009 | Walmsley | H04L 9/3247 713/189 |
| 2014/0016776 | A1* | 1/2014 | Van Foreest | G06F 21/73 380/46 |
| 2015/0261692 | A1* | 9/2015 | Benedetti | G06F 21/57 713/193 |
| 2016/0358264 | A1* | 12/2016 | Brightman | G06Q 40/04 |
| 2017/0346640 | A1* | 11/2017 | Smith | H04L 9/0825 |
| 2018/0183589 | A1* | 6/2018 | Danger | H04L 9/0877 |
| 2018/0234255 | A1* | 8/2018 | Fu | H04L 9/30 |
| 2018/0367317 | A1* | 12/2018 | Forler | G06F 21/86 |
| 2020/0311291 | A1* | 10/2020 | Troia | H04L 9/3226 |
| 2022/0191012 | A1 | 6/2022 | Gu et al. | |

FOREIGN PATENT DOCUMENTS

| | | |
|---|---|---|
| CN | 101465732 A | 6/2009 |
| CN | 102063593 A | 5/2011 |
| CN | 102063593 A * | 5/2011 |
| CN | 103136485 A * | 6/2013 |
| CN | 103136485 A | 6/2013 |
| CN | 103200562 A * | 7/2013 |
| CN | 103200562 A | 7/2013 |
| CN | 104838387 A | 8/2015 |
| CN | 106529271 A | 3/2017 |
| CN | 106899410 A | 6/2017 |
| CN | 108234115 A | 6/2018 |
| CN | 110009346 A | 7/2019 |
| KR | 100868121 B1 | 11/2008 |
| WO | 0182035 A2 | 11/2001 |
| WO | 2004050369 A1 | 6/2004 |
| WO | WO-2014056515 A1 * | 4/2014 ......... G06F 12/1408 |

OTHER PUBLICATIONS

"TCG Guidance for Securing Network Equipment Using TCG Technology," Version 1.0, Revision 29, Jan. 17, 2018 Published, 58 pages.

Trusted Platform Module Library Part 1: Architecture, Family 2.0, Level 00 Revision 01.16, Oct. 30, 2014, 269 pages.

Lin Yuesong et al "Research on PUF-Based Security Enhancement of Narrow-BandInternet of Things," 2018 IEEE 32nd International Conference on Advancedinformation Networking and Applications (AINA), May 16, 2018, pp. 702-709, XP033383573.

* cited by examiner

HARDWARE DETECTION METHOD AND APPARATUS, DEVICE, AND STORAGE MEDIUM

CROSS-REFERENCE TO RELATED APPLICATIONS

This application is a continuation of International Application No. PCT/CN2020/101699, filed on Jul. 13, 2020, which claims priority to Chinese Patent Application No. 201910673176.6, filed on Jul. 24, 2019. The disclosures of the aforementioned applications are hereby incorporated by reference in their entireties.

TECHNICAL FIELD

This application relates to the field of security technologies, and in particular, to a hardware detection method and apparatus, a device, and a storage medium.

BACKGROUND

Security of hardware is the basis of software security technologies such as a cryptographic algorithm and a security protocol. In recent years, attack behaviors that target hardware become more common. Therefore, how to perform hardware detection to ensure device security at a hardware level has become an important topic in the security field.

SUMMARY

Embodiments of this application provide a hardware detection method and apparatus, a device, and a storage medium, to resolve a problem in a related technology. Technical solutions are as follows.

According to a first aspect, a hardware detection method is provided. The method includes sending first verification data to a physical carrier, where the physical carrier carries a plurality of pieces of hardware; receiving a ciphertext and binding relationship information that are returned by the physical carrier, where the ciphertext is obtained after at least two of the plurality of pieces of hardware respectively encrypt the first verification data by using respective keys, and the binding relationship information is used to indicate a binding relationship between the at least two pieces of hardware; and verifying the ciphertext and the binding relationship information, and determining security of the at least two pieces of hardware based on a verification result.

The security of the hardware is verified based on the binding relationship between the hardware carried on the physical carrier and the ciphertext obtained through encryption by the hardware by using the respective keys. This can prevent attack behaviors such as hardware replacement and counterfeiting.

With reference to the first aspect, in a first possible implementation of the first aspect, the binding relationship information includes a binding relationship between the keys corresponding to the at least two pieces of hardware; the verifying the ciphertext and the binding relationship information includes obtaining the keys corresponding to the at least two pieces of hardware, and verify, based on the keys corresponding to the at least two pieces of hardware, whether the binding relationship included in the binding relationship information is correct; and using the keys corresponding to the at least two pieces of hardware to respectively decrypt the ciphertext obtained through encryption by the at least two pieces of hardware, and verifying whether second verification data obtained through decryption is consistent with the first verification data; and the determining security of the at least two pieces of hardware based on a verification result includes, when the verification result is that the binding relationship included in the binding relationship information is correct, and the second verification data obtained through decryption is consistent with the first verification data, determining that the at least two pieces of hardware are secure.

With reference to the first aspect or the first possible implementation of the first aspect, in a second possible implementation of the first aspect, the receiving a ciphertext and binding relationship information that are returned by the physical carrier includes receiving the ciphertext and a notarization certificate that are returned by the physical carrier, where the notarization certificate includes a binding relationship between the keys corresponding to the at least two pieces of hardware, and further includes a digital signature of the binding relationship; the verifying the ciphertext and the binding relationship information includes verifying, based on the digital signature in the notarization certificate, whether the binding relationship included in the binding relationship information is correct; and using the keys corresponding to the at least two pieces of hardware in the notarization certificate to respectively decrypt the ciphertext obtained through encryption by the at least two pieces of hardware, and verifying whether second verification data obtained through decryption is consistent with the first verification data; and the determining security of the at least two pieces of hardware based on a verification result includes, when the verification result is that the binding relationship included in the binding relationship information is correct, and the second verification data obtained through decryption is consistent with the first verification data, determining that the at least two pieces of hardware are secure.

The binding relationship between hardware is verified by using the notarization certificate, and can be compatible with standard Trusted Computing Group (TCG) authentication protocols. In addition, the binding relationship between hardware is extended in the protocols, and therefore has strong practicability.

With reference to the first aspect or the first or the second possible implementation of the first aspect, in a third possible implementation of the first aspect, the keys corresponding to the at least two pieces of hardware are generated by the at least two pieces of hardware respectively based on respective hardware identifiers.

The hardware identifier is an inherent attribute of the hardware, is unique and not replicable, and is protected by the hardware. Therefore, generating the keys of the hardware based on the respective hardware identifiers of the hardware not only enhances security of the keys, but also further enhances the security of the hardware.

With reference to the third possible implementation of the first aspect, in a fourth possible implementation of the first aspect, the hardware identifier includes a hardware unique key (HUK), a physical unclonable function (PUF), and identification information or an endorsement key (EK) in confidentiality-protected one-time programmable (OTP).

With reference to any one of the first aspect, or the first to the fourth possible implementations of the first aspect, in a fifth possible implementation of the first aspect, the key includes a symmetric key or an asymmetric key.

With reference to the fifth possible implementation of the first aspect, in a sixth possible implementation of the first aspect, when the key is an asymmetric key, the key includes a public key and a private key; and the ciphertext is obtained after the at least two pieces of hardware respectively encrypt the first verification data by using respective private keys, and the binding relationship information is obtained based on a binding relationship between public keys corresponding to the at least two pieces of hardware. The security of the hardware is further enhanced by using the asymmetric key.

According to a second aspect, a hardware detection method is provided. The method includes receiving first verification data sent by a verification unit; obtaining a ciphertext and binding relationship information, where the ciphertext is obtained after at least two of a plurality of pieces of hardware carried on a physical carrier respectively encrypt the first verification data by using respective keys, and the binding relationship information is used to indicate a binding relationship between the at least two pieces of hardware; and sending the ciphertext and the binding relationship information to the verification unit, where the verification unit verifies the ciphertext and the binding relationship information, and determines security of the at least two pieces of hardware based on a verification result.

With reference to the second aspect, in a first possible implementation of the second aspect, before the obtaining binding relationship information, the method further includes obtaining the keys of the at least two pieces of hardware, obtaining the binding relationship information based on a binding relationship between the keys of the at least two pieces of hardware, and storing the binding relationship information.

With reference to the first possible implementation of the second aspect, in a second possible implementation of the second aspect, the obtaining the binding relationship information based on a binding relationship between the keys of the at least two pieces of hardware, and storing the binding relationship information includes registering the keys of the at least two pieces of hardware to obtain a notarization certificate, and storing the notarization certificate, where the notarization certificate includes the binding relationship between the keys corresponding to the at least two pieces of hardware, and further includes a digital signature of the binding relationship; and the obtaining binding relationship information includes obtaining the notarization certificate.

With reference to the second aspect, or the first or the second possible implementation of the second aspect, in a third possible implementation of the second aspect, the keys corresponding to the at least two pieces of hardware are generated by the at least two pieces of hardware respectively based on respective hardware identifiers.

With reference to the third possible implementation of the second aspect, in a fourth possible implementation of the second aspect, the hardware identifier includes an HUK, a PUF, and identification information or an EK in confidentiality-protected OTP.

With reference to any one of the second aspect, or the first to the fourth possible implementations of the second aspect, in a fifth possible implementation of the second aspect, the key includes a symmetric key or an asymmetric key.

With reference to the fifth possible implementation of the second aspect, in a sixth possible implementation of the second aspect, when the key is an asymmetric key, the key includes a public key and a private key; and the ciphertext is obtained after the at least two pieces of hardware respectively encrypt the first verification data by using respective private keys, and the binding relationship information is obtained based on a binding relationship between public keys corresponding to the at least two pieces of hardware.

According to a third aspect, a hardware detection apparatus is provided. The apparatus includes a sending module configured to send first verification data to a physical carrier, where the physical carrier carries a plurality of pieces of hardware; a receiving module configured to receive a ciphertext and binding relationship information that are returned by the physical carrier, where the ciphertext is obtained after at least two of the plurality of pieces of hardware respectively encrypt the first verification data by using respective keys, and the binding relationship information is used to indicate a binding relationship between the at least two pieces of hardware; and a verification module configured to verify the ciphertext and the binding relationship information, and determine security of the at least two pieces of hardware based on a verification result.

With reference to the third aspect, in a first possible implementation of the third aspect, the binding relationship information includes a binding relationship between the keys corresponding to the at least two pieces of hardware; and the verification module is configured to obtain the keys corresponding to the at least two pieces of hardware, and verify, based on the keys corresponding to the at least two pieces of hardware, whether the binding relationship included in the binding relationship information is correct; use the keys corresponding to the at least two pieces of hardware to respectively decrypt the ciphertext obtained through encryption by the at least two pieces of hardware, and verify whether second verification data obtained through decryption is consistent with the first verification data; and when the verification result is that the binding relationship included in the binding relationship information is correct, and the second verification data obtained through decryption is consistent with the first verification data, determine that the at least two pieces of hardware are secure.

With reference to the third aspect or the first possible implementation of the third aspect, in a second possible implementation of the third aspect, the receiving module is configured to receive the ciphertext and a notarization certificate that are returned by the physical carrier, where the notarization certificate includes a binding relationship between the keys corresponding to the at least two pieces of hardware, and further includes a digital signature of the binding relationship; and the verification module is configured to verify, based on the digital signature in the notarization certificate, whether the binding relationship included in the binding relationship information is correct; use the keys corresponding to the at least two pieces of hardware in the notarization certificate to respectively decrypt the ciphertext obtained through encryption by the at least two pieces of hardware, and verify whether second verification data obtained through decryption is consistent with the first verification data; and when the verification result is that the binding relationship included in the binding relationship information is correct, and the second verification data obtained through decryption is consistent with the first verification data, determine that the at least two pieces of hardware are secure.

With reference to the third aspect, or the first or the second possible implementation of the third aspect, in a third possible implementation of the third aspect, the keys corresponding to the at least two pieces of hardware are generated by the at least two pieces of hardware respectively based on respective hardware identifiers.

With reference to the third possible implementation of the third aspect, in a fourth possible implementation of the third aspect, the hardware identifier includes a HUK, a PUF, and identification information or an EK in confidentiality-protected OTP.

With reference to any one of the third aspect, or the first to the fourth possible implementations of the third aspect, in a fifth possible implementation of the third aspect, the key includes a symmetric key or an asymmetric key.

With reference to the fifth possible implementation of the third aspect, in a sixth possible implementation of the third aspect, when the key is an asymmetric key, the key includes a public key and a private key; and the ciphertext is obtained after the at least two pieces of hardware respectively encrypt the first verification data by using respective private keys, and the binding relationship information is obtained based on a binding relationship between public keys corresponding to the at least two pieces of hardware.

According to a fourth aspect, a hardware detection apparatus is provided. The apparatus includes a receiving module configured to receive first verification data sent by a verification unit; a first obtaining module configured to obtain a ciphertext and binding relationship information, where the ciphertext is obtained after at least two of a plurality of pieces of hardware carried on a physical carrier respectively encrypt the first verification data by using respective keys, and the binding relationship information is used to indicate a binding relationship between the at least two pieces of hardware; and a sending module configured to send the ciphertext and the binding relationship information to the verification unit, where the verification unit verifies the ciphertext and the binding relationship information, and determines security of the at least two pieces of hardware based on a verification result.

With reference to the fourth aspect, in a first possible implementation of the fourth aspect, the apparatus further includes a second obtaining module configured to obtain the keys of the at least two pieces of hardware, and obtain the binding relationship information based on a binding relationship between the keys of the at least two pieces of hardware; and a storage module configured to store the binding relationship information.

With reference to the first possible implementation of the fourth aspect, in a second possible implementation of the fourth aspect, the second obtaining module is configured to register the keys of the at least two pieces of hardware to obtain a notarization certificate, where the notarization certificate includes the binding relationship between the keys corresponding to the at least two pieces of hardware, and further includes a digital signature of the binding relationship; the storage module is configured to store the notarization certificate; and the first obtaining module is configured to obtain the notarization certificate.

With reference to the fourth aspect, or the first or the second possible implementation of the fourth aspect, in a third possible implementation of the fourth aspect, the keys corresponding to the at least two pieces of hardware are generated by the at least two pieces of hardware respectively based on respective hardware identifiers.

With reference to the third possible implementation of the fourth aspect, in a fourth possible implementation of the fourth aspect, the hardware identifier includes a hardware unique key HUK, a physical unclonable function PUF, and identification information or an endorsement key EK in confidentiality-protected one-time programmable OTP.

With reference to any one of the fourth aspect, or the first to the fourth possible implementations of the fourth aspect, in a fifth possible implementation of the fourth aspect, the key includes a symmetric key or an asymmetric key.

With reference to the fifth possible implementation of the fourth aspect, in a sixth possible implementation of the fourth aspect, when the key is an asymmetric key, the key includes a public key and a private key; and the ciphertext is obtained after the at least two pieces of hardware respectively encrypt the first verification data by using respective private keys, and the binding relationship information is obtained based on a binding relationship between public keys corresponding to the at least two pieces of hardware.

According to a fifth aspect, a hardware detection device is provided. The device includes a memory and a processor. The memory stores at least one instruction, and the at least one instruction is loaded and executed by the processor, to implement the method in any possible implementation of the first aspect or the second aspect in this application.

According to a sixth aspect, a communication apparatus is provided. The apparatus includes a transceiver, a memory, and a processor. The transceiver, the memory, and the processor communicate with each other through an internal connection channel. The memory is configured to store instructions. The processor is configured to execute the instructions stored in the memory, to control the transceiver to receive a signal, and control the transceiver to send a signal. In addition, when the processor executes the instructions stored in the memory, the processor is enabled to perform the method in any possible implementation of the first aspect or the second aspect.

Optionally, there are one or more processors, and there are one or more memories.

Optionally, the memory may be integrated with the processor, or the memory and the processor are separately disposed.

In an implementation process, the memory may be a non-transitory (memory, for example, a read-only memory (ROM). The memory and the processor may be integrated on a same chip, or may be separately disposed on different chips. A type of the memory and a manner of disposing the memory and the processor are not limited in this embodiment of this application.

According to a seventh aspect, a computer program (product) is provided. The computer program (product) includes computer program code; and when the computer program code is run by a computer, the computer is enabled to perform the method in any possible implementation of the first aspect or the second aspect.

According to an eighth aspect, a readable storage medium is provided. The readable storage medium stores a program or instructions. When the program or the instructions are run on a computer, the method in any possible implementation of the first aspect or the second aspect is performed.

According to a ninth aspect, a chip is provided, and includes a processor. The processor is configured to invoke, from a memory, and run instructions stored in the memory, so that a communication device on which the chip is installed performs the method in any possible implementation of the first aspect or the second aspect.

According to a tenth aspect, another chip is provided, and includes an input interface, an output interface, a processor, and a memory. The input interface, the output interface, the processor, and the memory are connected to each other through an internal connection channel. The processor is configured to execute code in the memory. When the code is executed, the processor is configured to perform the method in any possible implementation of the first aspect or the second aspect.

DESCRIPTION OF EMBODIMENTS

Figure 1:
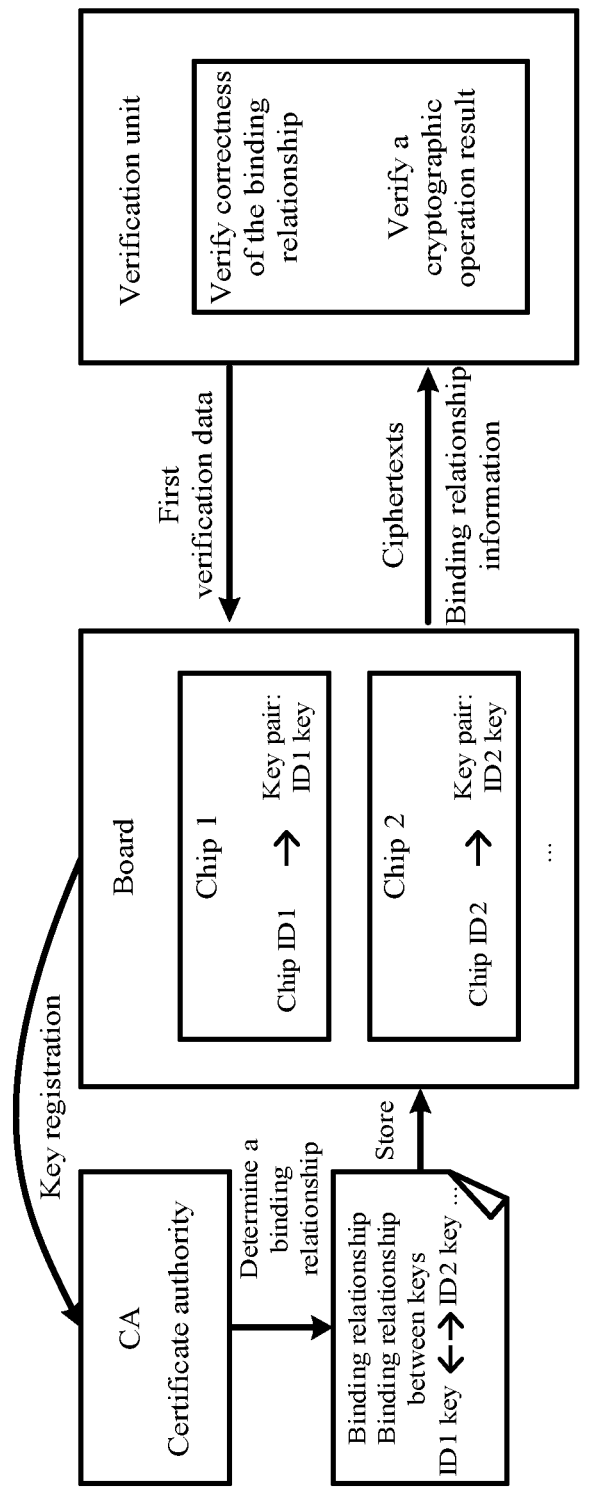
FIG. 1 is a schematic diagram of an implementation environment for hardware detection according to an embodiment of this application.

Terms used in implementations of this application are merely used to explain embodiments of this application, but are not intended to limit this application.

Security of hardware is a basis of software security technologies such as a cryptographic algorithm and a security protocol. In recent years, attack behaviors that target hardware become more common. For example, the attack behaviors include hardware counterfeiting and replacement.

In view of this, an embodiment of this application provides a hardware detection method. In the method, for the attack behaviors such as the hardware counterfeiting and replacement, a hardware binding security solution is proposed, and security of hardware carried on a physical carrier is ensured based on a cryptography principle. The physical carrier includes but is not limited to a board. The board includes parts such as a printed circuit board (PCB), a component, and a connector. The board is a circuit unit that can perform a function, and the board may be inserted into a connector on a backplane. A plurality of pieces of hardware are carried on the board. The hardware includes but is not limited to a processor, a microcontroller unit (MCU), a trusted platform module (TPM), a field-programmable gate array (FPGA), a complex programmable logic device (CPLD), and the like. The board and the backplane may be used as components of a network device. The network device is a routing device, for example, a router or a higher layer switch. The higher layer switch includes a layer 3 switch to a layer 7 switch, for example, is the layer 3 switch, a layer 4 switch, a layer 5 switch, a layer 6 switch, or the layer 7 switch. A switching device includes an Ethernet switch or the layer 3 switch to the layer 7 switch. Alternatively, the physical carrier may be a PCB having another function, for example, a main board of a handheld device, a main board of a computer, a main board of a server, or a PCB included in another electronic device.

An example in which the physical carrier includes a board and the board carries two pieces of hardware is used to describe an implementation environment to which the method provided in this embodiment of this application is applied. As shown in FIG. 1, the implementation environment includes a verification unit, a board, and a certificate authority (CA). The verification unit may be on a same side as the board, that is, relative to the board, the verification unit is a local device, and the verification unit locally implements detection on hardware on the board. Alternatively, the verification unit may be not on a same side as the board, but is remotely connected to the board, to remotely implement detection on the hardware on the board. Whether the verification unit is deployed locally is not limited in this embodiment of this application. As shown in FIG. 1, the two pieces of hardware carried on the board are a chip 1 and a chip 2. The chip 1 and the chip 2 may be chips that each process a core service function. If the chips are replaced or counterfeited, service security is directly threatened. Therefore, in this embodiment of this application, security detection is performed on the chips on the board in a manner such as generating chip identity keys by the chips, establishing a binding relationship between the chips based on the chip identity keys, and verifying integrity of the chips based on cryptography. The identity keys are keys used to represent identities of the different chips, and may also be derived from a root key.

As shown in FIG. 1, the verification unit sends first verification data to the board, and the chip 1 and the chip 2 on the board respectively generate the keys based on respective hardware identifiers. For example, the hardware identifier of the chip 1 is a chip ID1, and the hardware identifier of the chip 2 is a chip ID2. The key generated by the chip 1 is an ID1 key (key), and the key generated by the chip 2 is an ID2 key. The chip 1 encrypts the first verification data based on the key generated by the chip 1, to obtain a ciphertext, for example, a ciphertext 1. The chip 2 encrypts the first verification data based on the key generated by the chip 2, to obtain a ciphertext, for example, a ciphertext 2. In addition, a binding relationship between the chip 1 and the chip 2 is established based on the keys generated by the chip 1 and the chip 2, to obtain binding relationship information. The board sends the ciphertext 1, the ciphertext 2, and the binding relationship information to the verification unit. For example, the chip 1 or the chip 2 on the board may send the ciphertext 1, the ciphertext 2, and the binding relationship information to the verification unit; or after the chip 1 and the chip 2 encrypt the first verification data to obtain the ciphertexts, the chip 1 and the chip 2 may respectively send the respective obtained ciphertext 1 and ciphertext 2 to a component other than the chip 1 and the chip 2 on the board, the component sends the ciphertext 1, the ciphertext 2, and the binding relationship information to the verification unit; or the chip 1 sends the ciphertext 1 to the verification unit, the chip 2 sends the ciphertext 2 to the verification unit, and the chip 1 and/or the chip 2 send/sends the binding relationship to the verification unit. In this embodiment of this application, a manner of sending, by the board, the ciphertext 1, the ciphertext 2, and the binding relationship information to the verification unit is not limited. After the verification unit receives the ciphertext 1, the ciphertext 2, and the binding relationship information, the verification unit verifies correctness of the binding relationship and correctness of a cryptographic operation result in order to determine security of the chip 1 and the chip 2.

In a process in which the chip 1 and the chip 2 generate the keys, the keys may be generated before or after the first verification data sent by the verification unit is received. This is not limited in this embodiment of this application, provided that it can be ensured that the keys can be generated before the first verification data is encrypted. In addition, an execution sequence of several processes of encrypting first data by the chip 1 and the chip 2, and establishing the binding relationship between the chip 1 and the chip 2 based on the keys generated by the chip 1 and the chip 2, to obtain the binding relationship information is also not limited in this embodiment of this application.

In an example implementation, the binding relationship may be implemented in a form of a certificate. In the implementation environment shown in FIG. 1, that the board performs key registration in the CA is used as an example. The CA is the certificate authority. The board applies to the CA for the key registration, and the CA determines the binding relationship and generates a notarization certificate. The notarization certificate includes the binding relationship between the keys of the chip 1 and the chip 2, for example, a binding relationship between the ID1 key and the ID2 key. In addition, the notarization certificate further includes a digital signature obtained after the CA signs the binding relationship. The digital signature in the notarization certificate is obtained by the CA by using a private key of the CA to sign the binding relationship. The CA returns the notarization certificate to the board, and the board stores the notarization certificate. For example, the notarization certificate may be stored on the chip 1 or the chip 2, or stored in another storage area on the board other than the chip 1 and the chip 2. After receiving the first verification data sent by the verification unit, the board obtains the stored notarization certificate, and sends the notarization certificate and the ciphertexts to the verification unit.

Figure 2:
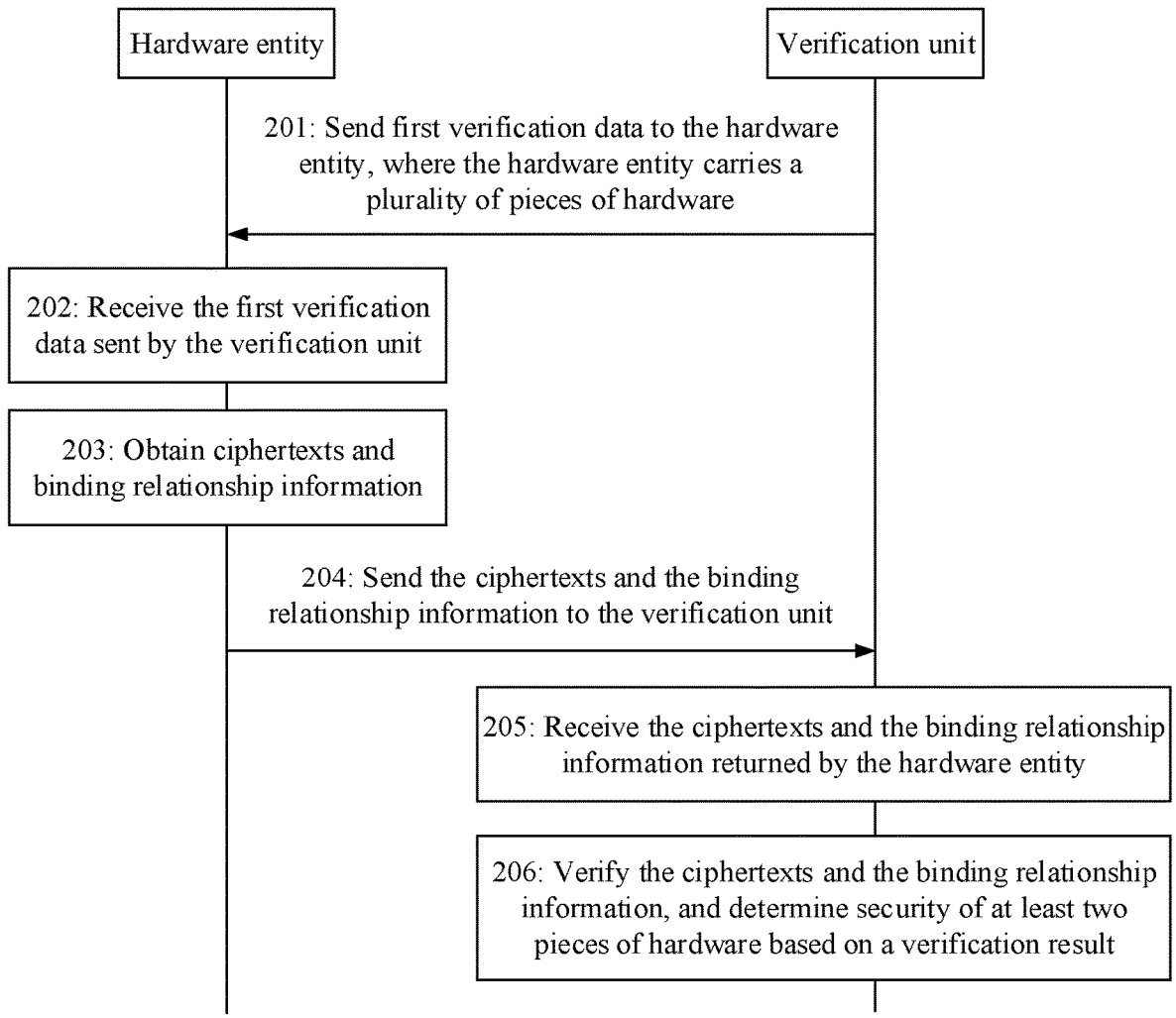
FIG. 2 is a flowchart of a hardware detection method according to an embodiment of this application.

The following describes, based on the implementation environment shown in FIG. 1, the hardware detection method provided in this embodiment of this application. As shown in FIG. 2, this method includes the following several steps.

Step 201: A verification unit sends first verification data to a physical carrier, where the physical carrier carries a plurality of pieces of hardware.

The first verification data sent by the verification unit to the physical carrier is used for subsequent verification. Content of the first verification data is not limited in this embodiment of this application. For example, the verification unit may initiate a challenge to the physical carrier based on a challenge-response mechanism, for example, send a random number (Nonce) to the physical carrier, where the random number is the first verification data. In addition to the random number, other data determined according to a communication protocol may also be sent. In this case, one or more of the random number and the other data determined according to the communication protocol may be used as the first verification data. For example, the other data determined by the communication protocol includes data determined according to the Quote Protocol of the TCG, data determined according to the Simple Network Management Protocol (SNMP), data determined according to the Network Configuration Protocol (NETCONF), or the like.

Because the physical carrier carries the plurality of pieces of hardware, the first verification data may be directly sent to one piece of hardware on the physical carrier, for example, sent to hardware that needs to be detected. Alternatively, the first verification data may be received through a data interface on the physical carrier, and then transmitted to hardware (for example, the hardware that needs to be detected) of the physical carrier.

Step 202: The physical carrier receives the first verification data sent by the verification unit.

The physical carrier receives the first verification data sent by the verification unit. The first verification data may be received by one of the plurality of pieces of hardware carried on the physical carrier, or may be received through the data interface on the physical carrier. After the first verification data reaches the physical carrier, to enable each piece of hardware for which hardware detection needs to be performed to encrypt the first verification data in order to perform a subsequent detection procedure, the first verification data needs to be transmitted to each piece of hardware that needs to be detected.

Step 203: The physical carrier obtains ciphertexts and binding relationship information.

The ciphertexts may be obtained by encrypting the first verification data by detected hardware by using keys of the detected hardware. The detected hardware may be at least two of the plurality of pieces of hardware carried on the physical carrier. In other words, the ciphertexts are obtained after the at least two of the plurality of pieces of hardware carried on the physical carrier respectively encrypt the first verification data by using respective keys. If all the hardware carried on the physical carrier needs to be detected, each piece of hardware carried on the physical carrier may encrypt the first verification data by using a respective key, to obtain a ciphertext.

The binding relationship information is used to indicate a binding relationship between the at least two pieces of hardware. A manner of obtaining the binding relationship information by the physical carrier may be establishing a binding relationship between the at least two pieces of hardware, to obtain the binding relationship information. For example, the physical carrier binds the keys of the at least two pieces of hardware, and uses a binding relationship between the keys as the binding relationship between the hardware. If all the hardware carried on the physical carrier needs to be detected, a binding relationship between all the hardware may be established. In other words, regardless of whether ciphertexts or binding relationship information is obtained, at least two of a plurality of pieces of hardware carried on a related physical carrier may be all hardware carried on the physical carrier, or may be some hardware carried on the physical carrier.

When more than two pieces of hardware need to be detected, all the pieces of hardware needing to be detected may be bound by using one binding relationship. For example, the one binding relationship includes keys of all the pieces of hardware needing to be detected. Alternatively, when more than two pieces of hardware need to be detected, a plurality of binding relationships may be used for binding. For example, one binding relationship is established between every two pieces of hardware, or one binding relationship is established for every three pieces of hardware. In this embodiment of this application, a quantity of hardware for which a binding relationship is established is not limited, and a quantity of established binding relationships is not limited either, provided that it is ensured that the binding relationship can be used to implement verification for each piece of hardware needing to be detected. For a case of a plurality of binding relationships, each binding relationship may be verified in the following verification manner. For example, for hardware 1 that needs to be detected, the verification unit may obtain a ciphertext of the hardware 1, a ciphertext generated by one or more pieces of hardware having a binding relationship with the hardware 1, and a binding relationship, to detect whether the hardware 1 is correct and trusted. A manner of generating the ciphertext by the plurality of pieces of hardware having the binding relationship with the hardware 1 is similar to the manner described in the embodiment, and details are not described again.

A key used by hardware to encrypt the first verification data is not limited in this embodiment of this application. For example, a root key is injected into hardware in a production and manufacturing process of the hardware, and an identity key may be derived based on the root key. In this case, the first verification data may be encrypted by using the identity key.

As an alternative to the foregoing manner of generating the identity key based on the root key, in an example embodiment, because a hardware identifier (ID) can be used to ensure authenticity of hardware and traceability of a supply chain, the hardware ID is an inherent attribute of the hardware, is unique and not replicable, and is protected by the hardware. However, the hardware ID is currently limited to being used in supply chain protection, and is not widely used in security technical solutions. Therefore, in the method provided in this embodiment of this application, the keys corresponding to the hardware are respectively generated by the at least two pieces of hardware based on respective hardware identifiers of the at least two pieces of hardware. Storage of the hardware ID is protected by the hardware, and in the manner of deriving the identity key based on the root key injected during production, the identity key is based on the root key, and security of the root key depends heavily on security of hardware production environment and security of a key injection manner. Therefore, compared with a common key generation manner, a manner of generating a key by using a hardware ID has higher security.

For example, the hardware ID includes but is not limited to a HUK, a PUF, and identification information or an EK in confidentiality-protected OTP. As hardware identifiers, the HUK, the PUF, and the identification information or the EK in the OTP each have features such as unique, random, tamper-proof, and secure access. Therefore, generating keys based on these hardware identifiers can ensure security of the keys. A type of hardware identifier used to generate a key may be determined based on hardware. Regardless of which type of hardware identifier is used, a generated key may be a symmetric key or an asymmetric key. If the generated key is a symmetric key, the symmetric key is used both when the first verification data is encrypted and when the binding relationship is established.

In an example embodiment, when the key is an asymmetric key, the key includes a public key and a private key. The ciphertexts are obtained after the at least two pieces of hardware respectively encrypt the first verification data by using respective private keys. The binding relationship information is obtained based on a binding relationship between public keys corresponding to the at least two pieces of hardware.

In addition, after the first verification data is received and the binding relationship is established between the hardware, the binding relationship information may be obtained. Alternatively, before the first verification data is received, the binding relationship may be established first, and the binding relationship information is stored. Before the binding relationship information is obtained, the method further includes obtaining the keys of the at least two pieces of hardware, obtaining the binding relationship information based on the binding relationship between the keys of the at least two pieces of hardware, and storing the binding relationship information. After the first verification data is received, the stored binding relationship information is obtained.

For example, that the physical carrier obtains the binding relationship information based on the binding relationship between the keys of the at least two pieces of hardware, and stores the binding relationship information includes the physical carrier registers the keys of the at least two pieces of hardware with a CA, and after determining a binding relationship that needs to be established, the CA establishes the binding relationship, and signs the binding relationship, to obtain a notarization certificate. As an alternative to the manner of centrally registering, by the physical carrier, the keys of the at least two pieces of hardware with the CA, in an example embodiment, the hardware on the physical carrier may send the respective keys to the CA for registration. For example, each piece of detected hardware sends a key of the detected hardware and an identifier of a physical carrier in which the detected hardware is located to the CA. The CA binds keys of hardware on a same physical carrier based on physical carrier identifiers sent by the hardware, to obtain a binding relationship, and signs the binding relationship to obtain a notarization certificate. A digital signature in the notarization certificate is obtained by the CA by using a private key of the CA to sign the binding relationship, regardless of whether the physical carrier uniformly performs registration or each piece of hardware on the physical carrier respectively performs registration. After obtaining the notarization certificate, the CA sends the notarization certificate to the physical carrier, and the physical carrier stores the notarization certificate. The notarization certificate includes the binding relationship between the keys corresponding to the at least two pieces of hardware, and further includes the digital signature obtained after the binding relationship is signed. If the binding relationship is implemented in a form of a certificate, that the physical carrier obtains the binding relationship information includes obtaining the notarization certificate. A binding relationship between hardware is established by using a key, and therefore the binding relationship is protected by a cryptography method. In addition, the binding relationship can be expressed in the form of a certificate. Therefore, it is easy to use.

For a certificate obtaining manner, as described in the implementation environment shown in FIG. 1, the hardware on the physical carrier or the physical carrier may register the keys with the CA, for instance, register the key of the chip 1 and the key of the chip 2: the ID1 key and the ID2 key. After determining the binding relationship between the key of chip 1 and the key of chip 2, the CA establishes the binding relationship between the key of the chip 1 and the key of the chip 2: the ID1 key and the ID2 key, and then uses the private key of the CA to sign the established binding relationship to obtain a notarization certificate. In other words, the notarization certificate includes the keys of the hardware for which the binding relationship is established, and the notarization certificate further includes the digital signature obtained by signing the binding relationship. For example, if the keys generated by the hardware are symmetric keys, the binding relationship between the hardware included in the notarization certificate is a binding relationship between the symmetric keys of the hardware. If the keys generated by the hardware are asymmetric keys, the binding relationship between the hardware included in the notarization certificate may be a binding relationship between public keys in the asymmetric keys of the hardware, and private keys of the hardware are stored in a secure environment of the hardware. The secure environment includes but is not limited to a trusted execution environment (TEE), that is, a secure running environment of code, or may be a secure production environment.

Step 204: The physical carrier sends the ciphertexts and the binding relationship information to the verification unit.

After obtaining the ciphertexts and the binding relationship information, the physical carrier sends the ciphertexts and the binding relationship information to the verification unit. When the physical carrier sends the ciphertexts and the binding relationship information to the verification unit, any hardware of the detected hardware on the physical carrier may send the ciphertexts and the binding relationship information. In this manner, after obtaining a ciphertext, each detected hardware on the physical carrier sends the ciphertext to the any hardware, and the any hardware sends the ciphertexts and the binding relationship information to the verification unit together. Alternatively, the ciphertexts and the binding relationship information may be sent by another component, other than the detected hardware, on the physical carrier. In this manner, after obtaining a ciphertext, each detected hardware on the physical carrier sends the ciphertext to another component, and the other component sends the ciphertexts and the binding relationship information to the verification unit together. For example, regardless of which entity sends the ciphertexts and the binding relationship information to the verification unit, because the detected hardware respectively encrypts the first verification data to obtain the ciphertexts, and a quantity of ciphertexts is consistent with a quantity of detected hardware, each ciphertext may be sequentially connected and added to a data format for sending. For example, a format of the ciphertexts is shown in the following Table 1.

TABLE 1

| Ciphertext 1 | Ciphertext 2 |
| --- | --- |

In addition to sending the ciphertexts and the binding relationship information, the physical carrier may further send other data to the verification unit, or may return together the first verification data sent by the verification unit. In this case, an example in which the first verification data is a random number Nonce is used, and a format of the ciphertexts is shown in the following Table 2. DATA may be other data. Content of the other data is not limited in this embodiment of this application.

TABLE 2

| DATA . . . | Nonce | Ciphertext 1 | Ciphertext 2 |
| --- | --- | --- | --- |

Step 205: The verification unit receives the ciphertexts and binding relationship information that are returned by the physical carrier.

The verification unit receives the ciphertexts and the binding relationship information that are returned by the physical carrier. If the binding relationship information is sent in the form of the notarization certificate, that the verification unit receives the ciphertexts and the binding relationship information that are returned by the physical carrier includes receiving the ciphertexts and the notarization certificate that are returned by the physical carrier, where the notarization certificate includes the binding relationship between the keys corresponding to the at least two pieces of hardware, and further includes the digital signature of the binding relationship.

Step 206: The verification unit verifies the ciphertexts and the binding relationship information, and determines security of the at least two pieces of hardware based on a verification result.

For example, the binding relationship information includes the binding relationship between the keys corresponding to the at least two pieces of hardware. That the verification unit verifies the ciphertexts and the binding relationship information includes obtaining the keys corresponding to the at least two pieces of hardware, and verifying, based on the keys corresponding to the at least two pieces of hardware, whether the binding relationship included in the binding relationship information is correct; and using the keys corresponding to the at least two pieces of hardware to respectively decrypt the ciphertexts encrypted by the at least two pieces of hardware, and verifying whether second verification data obtained through decryption is consistent with the first verification data.

A manner of obtaining, by the verification unit, the keys corresponding to the at least two pieces of hardware may be after establishing the binding relationship information, the physical carrier sends the key of each piece of hardware to the verification unit, and the verification unit stores the keys. The key of each piece of hardware may be sent to the verification unit by a component on the physical carrier centrally, or may be sent by each piece of hardware respectively. A manner of sending the key of each piece of hardware to the verification unit is not limited in this application. An example in which the physical carrier centrally sends the key of each piece of hardware to the verification unit is used. Because the verification unit may need to detect hardware on a plurality of physical carriers, the verification unit may receive keys sent by the plurality of physical carriers. When storing the keys, the verification unit may store each key in correspondence to a physical carrier identifier in order to distinguish between the keys of the hardware on the different physical carriers by using the physical carrier identifiers. When the hardware on the physical carrier is subsequently detected, the verification unit obtains, from the stored keys, the keys of the at least two pieces of hardware carried by the physical carrier. Certainly, another corresponding storage manner may alternatively be used. This is not limited in this embodiment of this application.

After obtaining the previously stored keys of the at least two pieces of hardware, the verification unit verifies, based on the keys corresponding to the at least two pieces of hardware, whether the binding relationship included in the binding relationship information is correct. For example, whether two keys in the binding relationship are the same as those stored previously by the verification unit. If the keys in the binding relationship are the same as those stored previously, the binding relationship is correct. If the keys in the binding relationship are different from those stored previously, the binding relationship is incorrect. As an alternative to this manner, if the binding relationship is implemented in the form of a certificate, the notarization certificate includes not only the binding relationship but also the digital signature obtained after the binding relationship is signed; in this case, the verification unit uses a key fed back by the certificate authority, and verifies the digital signature in the notarization certificate based on the key fed back by the certificate authority; and if the verification succeeds, the binding relationship is correct, or if the verification fails, the binding relationship is incorrect. The digital signature in the notarization certificate is obtained by the certificate authority by signing the binding relationship by using the private key of the certificate authority. Then, the verification unit may verify the digital signature in the notarization certificate based on the public key of the certificate authority.

When the binding relationship is correct, the keys corresponding to the at least two pieces of hardware are used to respectively decrypt the ciphertexts obtained through encryption by the at least two pieces of hardware, and whether second verification data obtained through decryption is consistent with the first verification data is verified. That the security of the at least two pieces of hardware is determined based on the verification result includes, when the verification result is that the binding relationship included in the binding relationship information is correct, and the second verification data obtained through decryption is consistent with the first verification data, determining that the at least two pieces of hardware are secure. For example, when the verification result is that the binding relationship included in the binding relationship information is incorrect, or the second verification data obtained through decryption is inconsistent with the first verification data, it may be determined that the hardware on the physical carrier is insecure, a security risk may exist, and corresponding exception handling may be performed.

It should be noted that, in the foregoing, first, the keys corresponding to the at least two pieces of hardware are obtained, and whether the binding relationship included in the binding relationship information is correct is verified based on the keys corresponding to the at least two pieces of hardware; and then, the keys corresponding to the at least two pieces of hardware are used to respectively decrypt the ciphertexts obtained through encryption by the at least two pieces of hardware, and whether the second verification data obtained through decryption is consistent with the first verification data is verified. In an example embodiment, alternatively, the keys corresponding to the at least two pieces of hardware may be obtained, the keys corresponding to the at least two pieces of hardware are used to respectively decrypt the ciphertexts obtained through encryption by the at least two pieces of hardware, and whether the second verification data obtained through decryption is consistent with the first verification data is verified. When it is verified that the second verification data obtained through decryption is consistent with the first verification data, whether the binding relationship included in the binding relationship information is correct is verified based on the keys corresponding to the at least two pieces of hardware. In other words, a sequence of verifying the cipher texts and verifying the binding relationship information by the verification unit is not limited in this embodiment of this application.

In addition, for example, when verifying whether the second verification data is consistent with the first verification data, the verification unit may compare each field in the first verification data with each field in the second verification data one by one, and may determine that the second verification data is consistent with the first verification data, only when all fields in the second verification data are completely consistent with all fields in the first verification data. In this manner, all the fields in the first verification data are compared with all the fields in the second verification data, and therefore a verification result is accurate, and reliability is high. For example, as an alternative to verification of all the fields, comparison may be performed between a target field in the second verification data and a target field in the first verification data, where the target field may be randomly selected or a key field may be used as the target field. When the target field in the second verification data matches the target field in the first verification data, it may be determined that the second verification data is consistent with the first verification data. In this manner of comparing the target fields, there is no need to compare all the fields in the second verification data with all the fields in the first verification data one by one, and therefore a verification speed can be improved. A manner used to verify whether the second verification data is consistent with the first verification data is not limited in this embodiment of this application.

It should be noted that, regardless of which manner of verifying whether the second verification data is consistent with the first verification data is used, the first verification data may be sent by the physical carrier. In other words, after the verification unit sends the first verification data to the physical carrier, when returning the ciphertexts and the binding relationship information to the verification unit, the physical carrier also returns the first verification data to the verification unit. After decrypting the ciphertexts, the verification unit compares the second verification data obtained through decryption with the first verification data. In an example embodiment, alternatively, the physical carrier may not return the first verification data. In this case, the verification unit may record the first verification data previously sent to the physical carrier, and then, after receiving the ciphertexts and the binding relationship information that are sent by the physical carrier and decrypting the ciphertexts, compare the second verification data obtained through decryption with the recorded first verification data. A manner of recording, by the verification unit, the first verification data sent to the physical carrier is not limited in this embodiment of this application, provided that the content of the first verification data sent to the physical carrier can be subsequently determined for the physical carrier.

Figure 3:
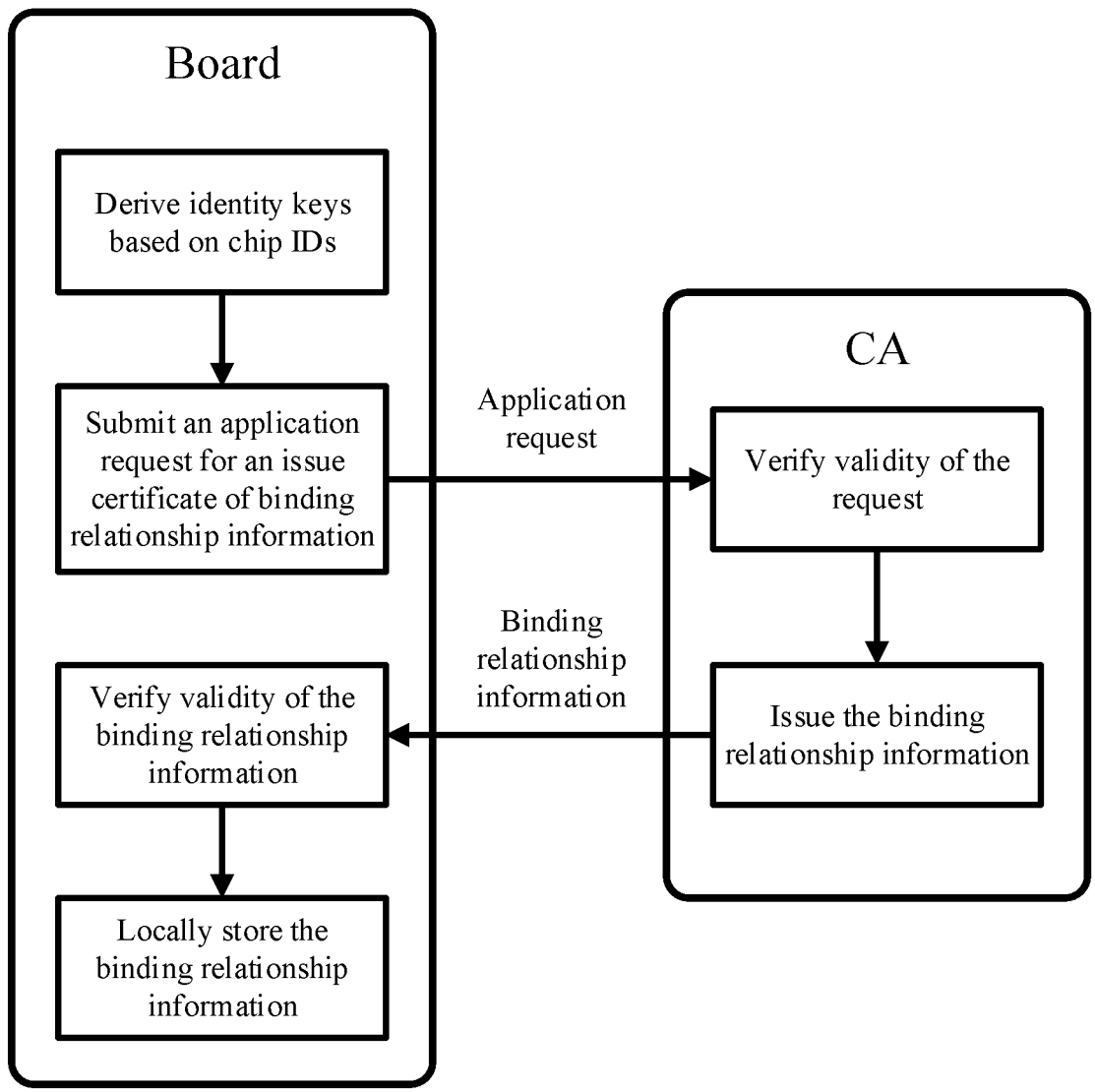
FIG. 3 is a schematic diagram of a process of establishing a binding relationship according to an embodiment of this application.
Figure 4:
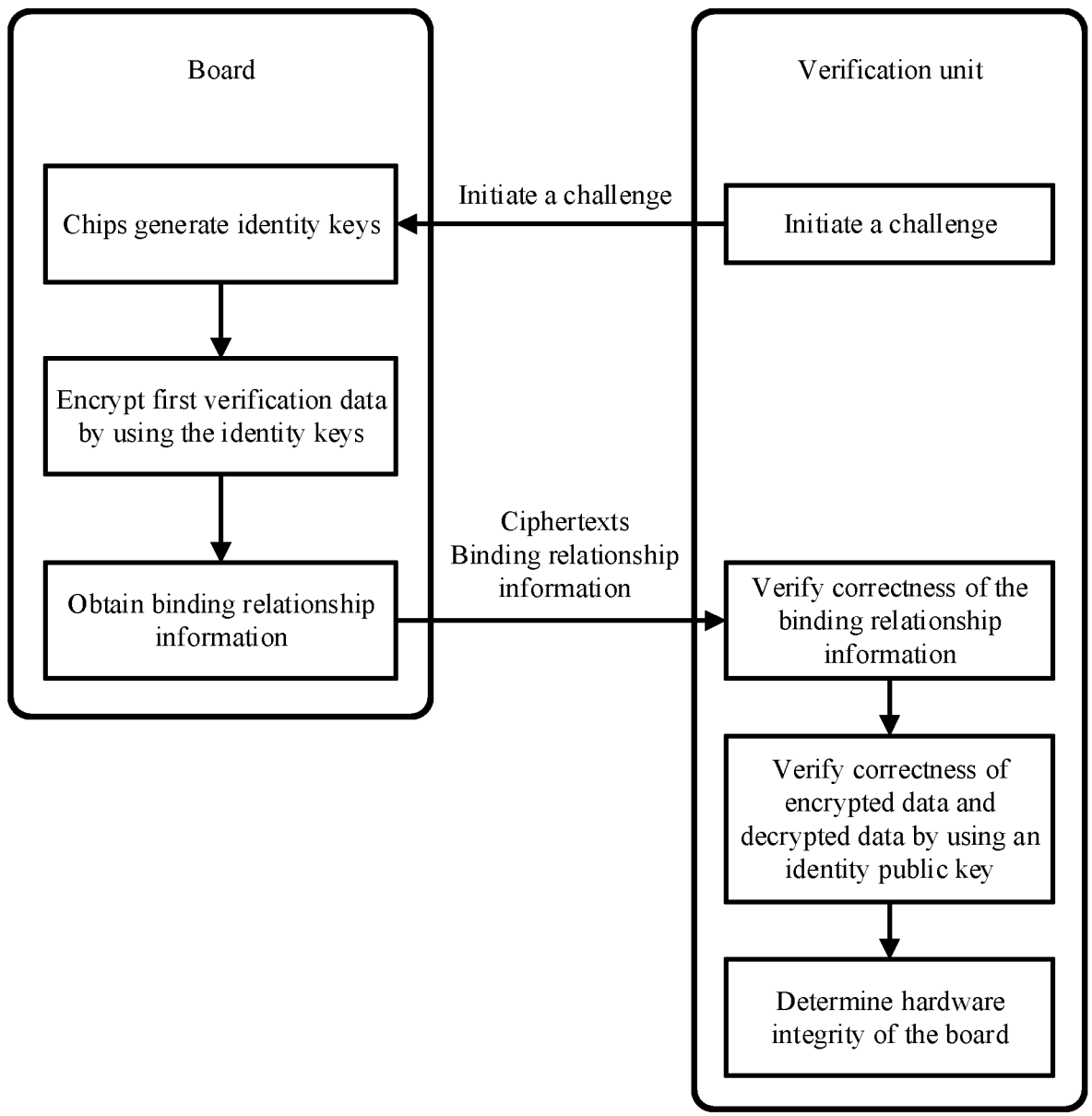
FIG. 4 is a schematic diagram of a process of hardware detection according to an embodiment of this application.

FIG. 3 shows an example of a process of obtaining the binding relationship information by using the physical carrier as a board and the hardware on the physical carrier as chips. In FIG. 3, after generating identity keys based on chip IDs, the chips on the board submit an application request for an issue certificate of the binding relationship information. After receiving the application request from the board and verifying validity of the request, the CA issues the binding relationship information, namely, the notarization certificate. The notarization certificate, namely, the binding relationship information, is sent to the board. After verifying validity of the binding relationship information, the board locally stores the binding relationship information. Then, when hardware detection needs to be performed on the chips on the board, refer to FIG. 4. FIG. 4 shows a hardware detection process. In FIG. 4, the verification unit initiates a challenge to the board, the chips on the board generate the identity keys, and use the identity keys to encrypt the first verification data sent by the verification unit, to obtain the ciphertexts. In addition, the board obtains the binding relationship information, such as the obtained notarization certificate in FIG. 3, obtained based on a binding relationship between the chips. Then, the board sends both the ciphertexts and the binding relationship information to the verification unit. The verification unit verifies correctness of the binding relationship information and uses the corresponding identity keys to verify correctness of encrypted data, namely, the ciphertexts. After the hardware carried on the physical carrier is bound, if the hardware is counterfeited or replaced, the binding relationship between the hardware changes, and subsequent verification fails. Therefore, the security of the hardware on the board can be determined through the verification of the binding relationship and the ciphertexts. The ciphertexts are used to verify authenticity of the hardware on the board, and the binding relationship is used to verify integrity of the hardware on the board.

It should be noted that the foregoing hardware detection method is described by using detection of the hardware on the board as an example. In addition to being applied to the board, the method provided in this embodiment may further be used to separately perform hardware detection on a plurality of boards in an entire device. The foregoing method may be used to implement a hardware detection manner on each board. For the entire device, if a board does not pass the hardware detection, for example, if an unauthenticated board is inserted, the device generates an alarm or rejects providing a service by the unauthenticated board. Certainly, an alarm may also be implemented through board replacement between devices such that hardware integrity of the entire device can be further protected.

In addition, in an example embodiment, in the method provided in this embodiment of this application, based on hardware detection, a hardware detection result may be further combined with another technology. For example, a hardware detection result obtained by using the method provided in this embodiment of this application is combined with a Joint Test Action Group (JTAG) authentication technology. A JTAG authentication function ensures that an unauthenticated emulator or control unit cannot obtain chip JTAG debugging control permission. When the method provided in this embodiment of this application is integrated with the JTAG authentication technology, for example, JTAG rights may be granted only when hardware passes detection, that is, the JTAG authentication function is used through the JTAG rights. Hardware security can be ensured to a greater extent through combination of the JTAG authentication technology with the hardware detection method provided in this embodiment of this application.

In conclusion, according to the method provided in this embodiment of this application, the security of the hardware is verified based on the binding relationship between the hardware carried on the physical carrier and the ciphertexts obtained through encryption by the hardware by using the respective keys. This can prevent attack behaviors such as hardware replacement and counterfeiting.

In addition, use hardware keys and cryptographic methods (such as digital signatures and asymmetric encryption and decryption) to verify the authenticity of the hardware. A verification process may be based on the challenge-response mechanism. Each piece of hardware uses a private key to respond to the challenge. The verification unit verifies correctness of the response by using a public key of each piece of hardware, and determines whether the hardware is tampered with. The verification process can be compatible with a TCG verification specification or an Internet Engineering Task Force (IETF)-remote attestation procedures (RATS) verification specification.

The hardware detection method provided in this embodiment of this application may be applied to a plurality of scenarios, and is applicable to detection of a plurality of types of hardware. Next, based on the foregoing hardware detection method, examples are used for description of different application scenarios.

Scenario 1: Scenario of Protecting a Hardware Root of Trust

Figure 5:
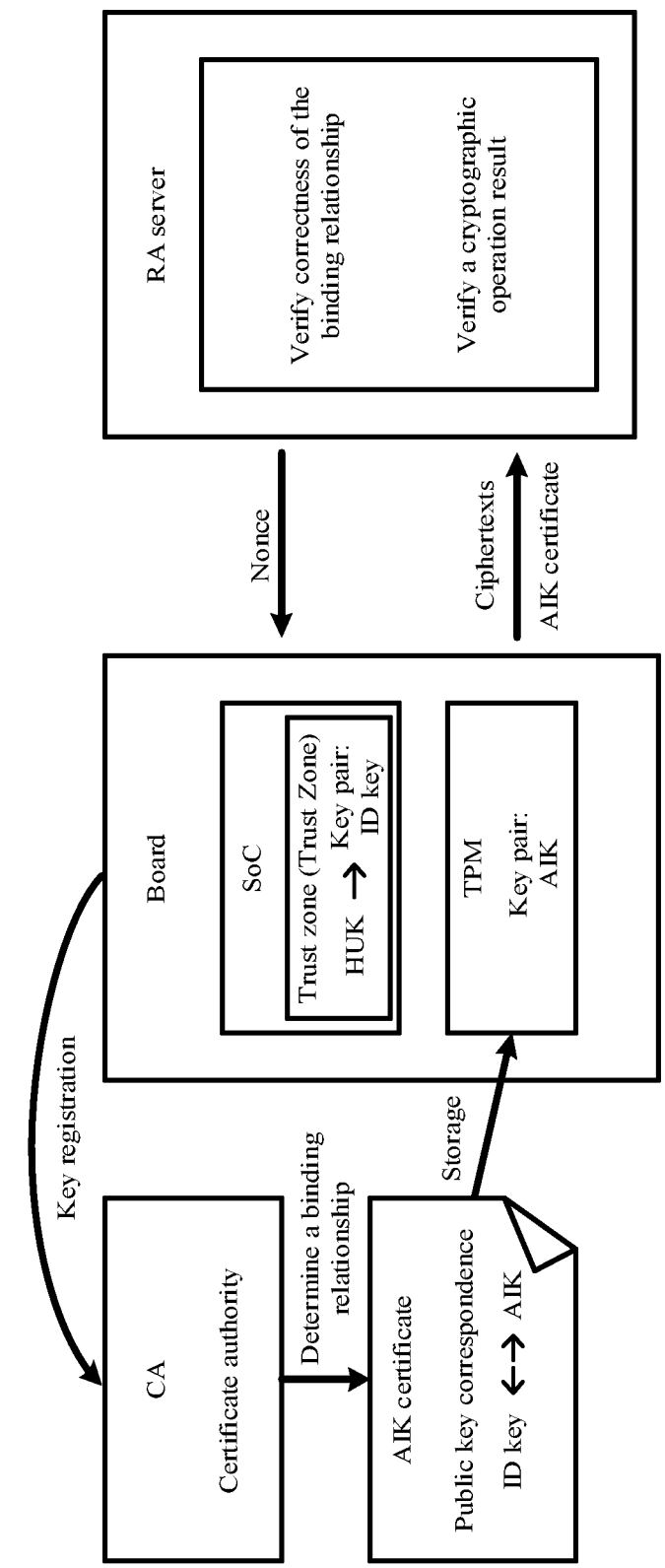
FIG. 5 is a schematic diagram of an implementation environment for hardware detection according to an embodiment of this application.
Figure 6:
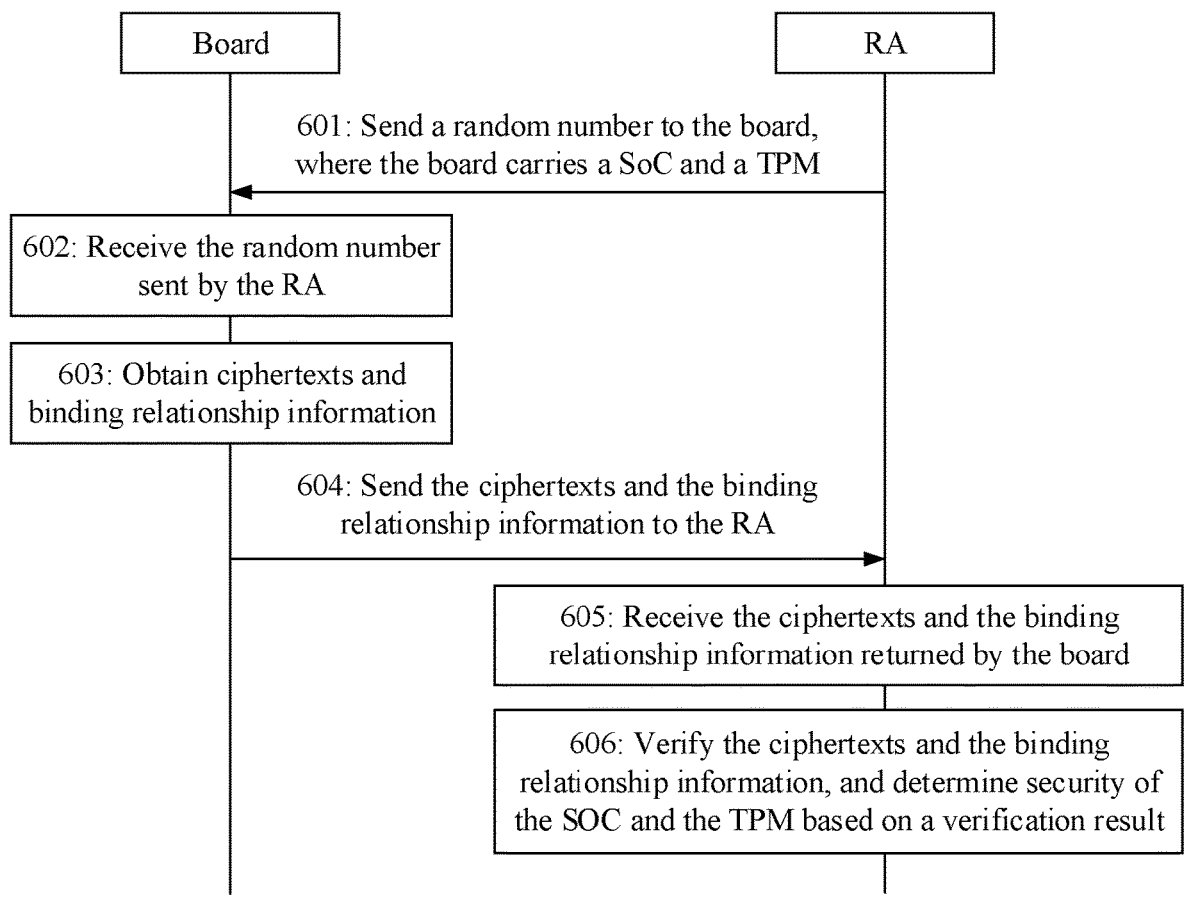
FIG. 6 is a flowchart of a hardware detection method according to an embodiment of this application.

The hardware root of trust is a basis for secure boot and trusted boot of a board. Therefore, it is particularly important to protect integrity of the hardware root of trust. The hardware root of trust of the board usually includes a processor and a TPM security chip. The processor is used as a root of trust for measurement, and the TPM chip is used as a root of trust for reporting and a root of trust for storage. In this case, hardware detection is performed on the processor and the TPM chip on the board. That the processor is a system on a chip (SoC) is used as an example. An implementation environment for the hardware detection method is shown in FIG. 5. With reference to the implementation environment shown in FIG. 5, a hardware detection method provided in an embodiment of this application may be shown in FIG. 6. That a physical carrier is a board and a verification unit is a remote attestation (RA) server is used as an example. The hardware detection method includes the following several steps.

Step 601: The RA server sends a random number to the board, where the board carries a SoC and a TPM.

The random number sent by the RA server to the board is used for subsequent verification, and content of the random number is not limited in this embodiment of this application. For example, the RA server may initiate a challenge to the board based on a challenge-response mechanism, to send the random number (Nonce) to the board. In addition to the random number, other data determined according to a communication protocol may also be sent. In this case, the random number and the other data determined according to the communication protocol may be each used as a first verification data. For example, in this embodiment of this application, in addition to the random number, the RA server may further send a value of a port command register (PCR) to the board.

An example in which only the random number is sent is used. The board carries two pieces of hardware, for example, the SoC and the TPM, and therefore the random number may be sent to the SoC on the board, and then sent inside the board to the TPM. Alternatively, the random number may be received by a data interface on the board and then transmitted to the SoC and TPM.

Step 602: The board receives the random number sent by the RA server.

After the board receives the random number sent by the RA server, the random number needs to be transmitted to the SoC and the TPM such that both the SoC and the TPM for which hardware detection needs to be performed can encrypt the random number, to perform a subsequent detection procedure.

Step 603: The board obtains ciphertexts and binding relationship information.

The ciphertexts are obtained after the SoC and TPM carried on the board respectively use respective keys to encrypt the random number. If the RA server sends both the random number and the value of the PCR register, the ciphertexts are obtained after the SoC and TPM carried on the board respectively use the respective keys to encrypt the random number and the value of the PCR register. In an example embodiment, the keys corresponding to the hardware are generated by the hardware based on respective hardware identifiers.

Currently, a TEE is supported by all mainstream processors, for example, a trust zone of an advanced reduced instruction set computing machines (ARM) processor, and software guard extensions (SGX) of an Intel® processor. The TEE has a high security feature, and can ensure confidentiality and integrity of an asymmetric key, especially a private key. Therefore, as shown in FIG. 5, the SoC may read HUK information and generate an identity key pair based on the TEE trusted execution environment, for example, in the trust zone, that is, the SoC uses an HUK to generate an asymmetric key, including a public key and a private key, and securely stores the private key in the TEE. For example, a key generated by the SoC in FIG. 5 is an ID key.

For the TPM chip, according to a TCG technical specification, an EK is used to generate an attestation identity key (AIK), which is used as an identity key of the TPM chip. In addition, a security attribute of the TPM chip can provide a high security protection environment for key storage and access.

Figure 7:
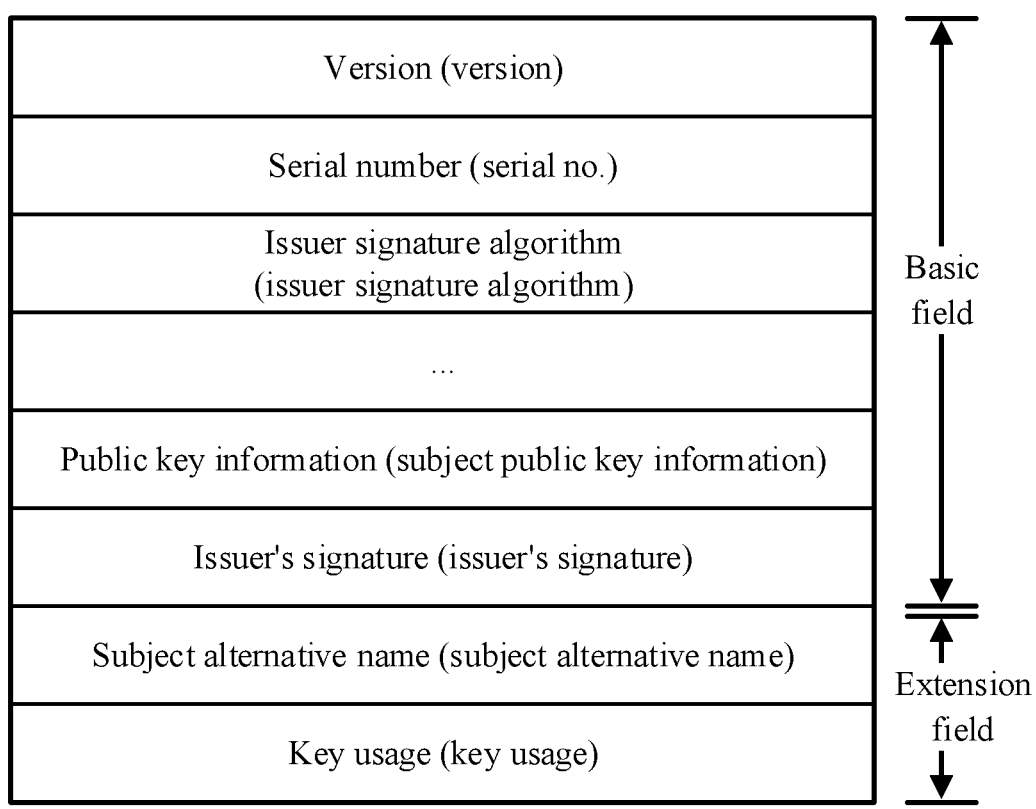
FIG. 7 is a schematic diagram of a structure of a certificate according to an embodiment of this application.

The binding relationship information is used to indicate a binding relationship between the SoC and the TPM. For example, before the hardware detection is performed, the binding relationship information may be obtained based on a binding relationship between the keys of the SoC and the TPM, and the binding relationship information is stored. For example, the board applies to a CA for an AIK certificate. For example, the board registers public keys of the SoC and TPM, and the CA issues the AIK certificate to the board. The board stores the AIK certificate in the TPM. The AIK certificate includes a binding relationship between the public key of the SoC and the AIK public key of the TPM, and a digital signature. The digital signature is obtained by the CA by using a private key of the CA to sign the binding relationship. FIG. 7 shows a structure of the AIK certificate. In FIG. 7, the AIK certificate includes a basic field and an extension field. The basic field includes a version, a serial number, an issuer signature algorithm, subject public key information, and an issuer's signature. The public key information stores the AIK public key, and the issuer signature is a digital signature obtained after the CA signs the binding relationship. The extension field includes a subject alternative name and key usage, where the subject alternative name stores public key information of an HUK derived key.

In addition, the AIK certificate may be in an X509.v3 format or a user-defined format. This is not limited in this embodiment of this application. A standard X509.v3 version is used as an example in FIG. 7. Because endorsement of the AIK certificate is provided by the CA, in the method provided in this embodiment of this application, the AIK certificate in the TCG is borrowed to express a binding relationship between a processor and the TPM chip.

In this case, that the board obtains the binding relationship information includes: obtaining a notarization certificate. In the implementation environment shown in FIG. 5, the board may register a key with the CA to obtain the notarization certificate, where the notarization certificate includes keys of hardware for which a binding relationship is established and a digital signature of the binding relationship. For the keys generated by the SoC and TPM, the binding relationship included in the AIK certificate may be a binding relationship between an ID key and an AIK. That is, the binding relationship of the hardware root of trust is established by using the AIK certificate. A digital signature of the binding relationship may be obtained by the CA by using a private key of the CA to sign the binding relationship.

Step 604: The board sends the ciphertexts and the binding relationship information to the RA server.

After obtaining the ciphertexts and the binding relationship information, the board sends the ciphertexts and the binding relationship information to the RA server. For example, because the SoC and the TPM separately encrypt the random number to obtain the ciphertexts, there are two ciphertexts. For example, the SoC encrypts the random number to obtain a SoC signature, and the TPM encrypts the random number to obtain an AIK signature. In this case, the SoC signature and the AIK signature may be sequentially connected and added to a data format for sending. For example, the data format is shown in the following Table 3.

TABLE 3

| AIK signature | SoC signature |
| --- | --- |

Certainly, in addition to sending the ciphertexts and the binding relationship information to the RA server, the board may also send other data to the RA server, or may return together the random number sent by the RA server. For example, if the RA server sends both the random number and the value of the PCR register to the board, the board sends the SoC signature and the AIK signature to the RA server, and may also send both the random number and the value of the PCR register to the RA server. For this case, for example, the data format is shown in the following Table 4.

TABLE 4

| Nonce | Value of a PCR register | AIK signature | SoC signature |
| --- | --- | --- | --- |

Step 605: The RA server receives the ciphertexts and the binding relationship information that are returned by the board.

The RA server receives the ciphertexts and the binding relationship information returned by the board. As shown in FIG. 5, the binding relationship information is sent in a form of the notarization certificate. In this case, the RA server receives the ciphertexts and the AIK certificate that are returned by the board, where the certificate includes the binding relationship between the keys corresponding to the SoC and the TPM.

Step 606: The RA server verifies the ciphertexts and the binding relationship information, and determines security of the SOC and the TPM based on a verification result.

For example, the binding relationship information includes the binding relationship between the keys corresponding to the at least two pieces of hardware. That the RA server verifies the ciphertexts and the binding relationship information includes obtaining public keys corresponding to the SoC and the TPM; determining, based on the public keys corresponding to the SoC and the TPM, whether the binding relationship included in the binding relationship information is correct; and using the public keys corresponding to the SoC and the TPM to respectively decrypt the ciphertexts obtained through encryption by the SoC and the TPM, and verifying whether data obtained through decryption is consistent with the random number.

A manner of obtaining, by the RA server, the public keys corresponding to the SoC and the TPM may be after establishing the binding relationship information, the board sends the public keys of the SoC and the TPM to the RA server, and the RA server stores the public keys of the SoC and the TPM. Because the RA server may need to detect hardware on a plurality of boards, the RA server may receive keys sent by the plurality of boards. When storing the keys, the RA server may store each key in correspondence to a board identifier in order to distinguish between the keys of the hardware on the different boards by using board identifiers. Subsequently, when hardware on the board is detected, the RA server obtains keys of the at least two pieces of hardware carried on the board from the stored keys.

After obtaining the previously stored public keys of the SoC and the TPM, the RA server determines, based on the public keys corresponding to the SoC and the TPM, whether the binding relationship included in the binding relationship information is correct. If the binding relationship is implemented in a form of a certificate, the notarization certificate includes not only the binding relationship but also a digital signature obtained after the binding relationship is signed. The digital signature is signed by the certificate authority by using the private key of the certificate authority. In this case, the RA server verifies, based on the digital signature in the notarization certificate, whether the binding relationship included in the binding relationship information is correct. For example, the RA server uses a public key of the certificate authority to verify the digital signature in the notarization certificate. If the verification succeeds, the binding relationship is correct. If the verification fails, the binding relationship is incorrect. Regardless of whether the certificate is used, if the binding relationship is verified to be correct, the keys corresponding to the SoC and the TPM are used to respectively decrypt the ciphertexts obtained through encryption by the SoC and the TPM, and whether the data obtained through decryption is consistent with the random number is verified. Then, the security of the SoC and the TPM is determined based on the verification result. For example, when the verification result is that the binding relationship included in the binding relationship information is correct, and the data obtained through decryption is consistent with the random number, it is determined that the SoC and the TPM are secure. It indicates that the SoC and the TPM are authentic, and there is no attack such as counterfeiting or replacement. For example, when the verification result is that the binding relationship included in the binding relationship information is incorrect, or the data obtained through decryption is consistent with the random number, it may be determined that the SoC and the TPM on the board are insecure, a security risk may exist, and corresponding exception handling may be performed. A manner of the exception processing is not limited in this embodiment of this application.

In conclusion, according to the method provided in this embodiment of this application, the security of the SoC and the TPM is verified based on the binding relationship between the SoC and the TPM that are carried on the board and the ciphertexts obtained through encryption by the SoC and the TPM by using the respective keys of the SoC and the TPM such that attack behaviors such as the replacement and the counterfeiting can be prevented from occurring on the SoC and the TPM. In addition, in this embodiment of this application, the RA server is used as the verification unit, and a trusted verification procedure in the TCG may be used for an encryption and decryption operation on the nonce (random number). The foregoing service procedure may be established based on a standard trusted computing procedure. Therefore, the foregoing service process is capable of not increasing hardware implementation complexity of a system, and has feasibility.

Scenario 2: Scenario of Protecting a Data Processing Unit

Figure 8:
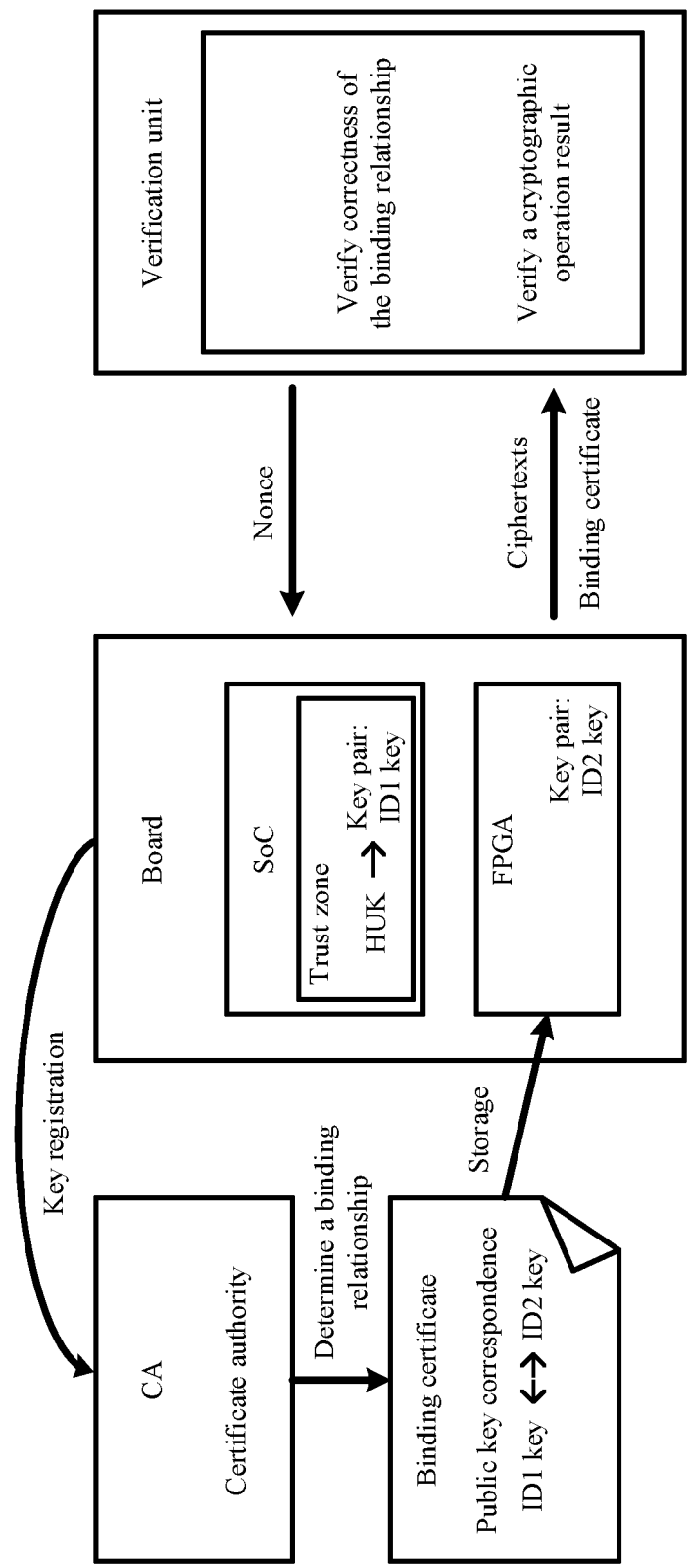
FIG. 8 is a schematic diagram of an implementation environment for hardware detection according to an embodiment of this application.
Figure 9:
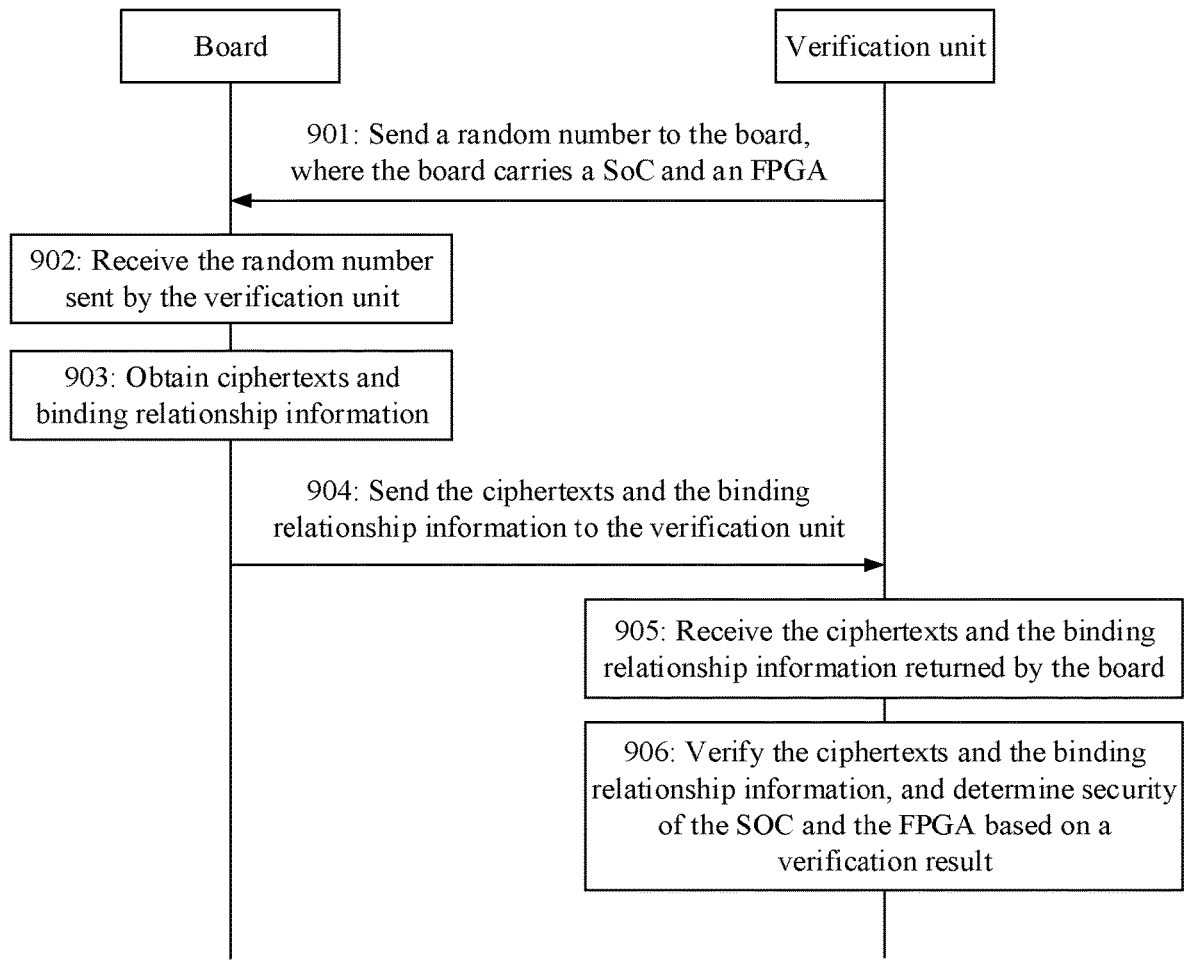
FIG. 9 is a flowchart of a hardware detection method according to an embodiment of this application.

A processor and an FPGA are important data processing units on a board. Usually, the processor tends to implement control, storage, and data processing functions. In a scenario that has a high requirement on data stream processing performance, a hardware acceleration function is implemented by using the FPGA. For example, in a crypto-accelerator card, an FPGA is usually responsible for hardware acceleration of a cryptographic operation, and a processor is mainly configured to perform management and inter-board data communication. That the processor or the FPGA include hardware Trojan (Trojan) and spyware (Spyware) will directly cause a security risk of a system. Therefore, it is particularly important to ensure hardware integrity and authenticity of the FPGA and the processor on the board. An example in which the processor is a SoC is used as an example. An implementation environment for the hardware detection method is shown in FIG. 8. With reference to the implementation environment shown in FIG. 8, a hardware detection method provided in an embodiment of this application may be shown in FIG. 9, and includes the following several steps.

Step 901: A verification unit sends a random number to a board, where the board carries a SoC and an FPGA.

The random number sent by the verification unit to the board is used for subsequent verification, and content of the random number is not limited in this embodiment of this application. For example, the verification unit may initiate a challenge to the board based on a challenge-response mechanism, to send the random number (Nonce) to the board. In addition to the random number, other data determined according to a communication protocol may also be sent. In this case, the random number and the other data determined according to the communication protocol may be each used as the first verification data.

The board carries two pieces of hardware, for example, the SoC and the FPGA, and therefore the random number may be sent to the SoC on the board, and then sent inside the board to the FPGA. Alternatively, the random number may be received by a data interface on the board and then transmitted to the SoC and FPGA.

Step 902: The board receives the random number sent by the verification unit.

After the board receives the random number sent by the verification unit, the random number needs to be transmitted to the SoC and the FPGA such that both the SoC and the FPGA for which hardware detection needs to be performed can encrypt the random number, to perform a subsequent detection procedure.

Step 903: The board obtains ciphertexts and binding relationship information.

The ciphertexts are obtained after the SoC and FPGA carried on the board respectively use respective keys to encrypt the random number. In an example embodiment, the keys corresponding to the hardware are generated by the hardware based on respective hardware identifiers.

Currently, a TEE is supported by all mainstream processors, for example, a trust zone (trust zone) of an advanced reduced instruction set computing machines (advanced reduced instruction set computing machines, ARM) processor, and SGX of an Intel (Intel) processor. The TEE has a high security feature, and can ensure confidentiality and integrity of an asymmetric key, especially a private key. Therefore, as shown in FIG. 5, the SoC may read HUK information and generate an identity key pair based on the TEE trusted execution environment, that is, the SoC uses an HUK to generate an asymmetric key, including a public key and a private key, and securely stores the private key in the TEE. For example, a key generated by the SoC in FIG. 8 is an ID1 key.

For an FPGA chip, an asymmetric key is generated according to the PUF and is used as an identity key of the FPGA chip. As shown in FIG. 8, a key generated by the FPGA is an ID2 key. In addition, the FPGA chip provides a high security protection environment for key storage and access.

The binding relationship information is used to indicate a binding relationship between the SoC and the FPGA. For example, before the detection, the binding relationship information may be obtained based on a binding relationship between the keys of the SoC and the FPGA, and the binding relationship information is stored. For example, public keys of the SoC and the FPGA are registered to obtain a notarization certificate, and the notarization certificate is stored. The notarization certificate includes a binding relationship between the public keys corresponding to the SoC and the FPGA, and further includes a digital signature of the binding relationship. In this case, the obtaining binding relationship information includes obtaining the notarization certificate. In the implementation environment shown in FIG. 8, the board may register a key with the CA, and after obtaining a notarization certificate, the CA sends the notarization certificate to the board. The notarization certificate includes keys of hardware for which a binding relationship is established and a digital signature of the binding relationship. The digital signature may be obtained by the CA by using a private key of the CA to sign the binding relationship. For the keys generated by the SoC and FPGA, a binding relationship included in a notarization certificate may be a binding relationship between the ID1 key and the ID2 key.

Step 904: The board sends the ciphertexts and the binding relationship information to the verification unit.

After obtaining the ciphertexts and the binding relationship information, the board sends the ciphertexts and the binding relationship information to the verification unit. For example, because the SoC and the FPGA respectively encrypt the random number to obtain the ciphertexts, and there are two ciphertexts, each ciphertext may be sequentially connected and added to a data format for sending. Certainly, in addition to sending the ciphertexts and the binding relationship information, the board may further send other data to the verification unit, or may return together the random number sent by the verification unit. In the implementation environment shown in FIG. 8, the board sends the ciphertexts and the certificate to the verification unit.

Step 905: The verification unit receives the ciphertexts and the binding relationship information that are returned by the board.

The verification unit receives the ciphertexts and the binding relationship information returned by the board. As shown in FIG. 8, the binding relationship information is sent in a form of the notarization certificate. In this case, the verification unit receives the ciphertexts and an AIK certificate that are returned by the board, where the certificate includes the binding relationship between the keys corresponding to the SoC and the FPGA, and the digital signature of the binding relationship.

Step 906: The verification unit verifies the ciphertexts and the binding relationship information, and determines security of the SOC and the FPGA based on a verification result.

For example, the binding relationship information includes the binding relationship between the keys corresponding to the at least two pieces of hardware. That the verification unit verifies the ciphertexts and the binding relationship information includes obtaining public keys corresponding to the SoC and the FPGA; determining, based on the public keys corresponding to the SoC and the FPGA, whether the binding relationship included in the binding relationship information is correct; and using the public keys corresponding to the SoC and the FPGA to respectively decrypt the ciphertexts obtained through encryption by the SoC and the FPGA, and verifying whether data obtained through decryption is consistent with the random number.

A manner of obtaining, by the verification unit, the public keys corresponding to the SoC and the FPGA may be after establishing the binding relationship information, the board sends the public keys of the SoC and the FPGA to the verification unit, and the verification unit stores the public keys. Because the verification unit may need to detect hardware on a plurality of boards, the verification unit may receive keys sent by the plurality of boards. When storing the keys, the verification unit may store each key in correspondence to a board identifier in order to distinguish between the keys of the hardware on the different boards by using board identifiers. Subsequently, when hardware on the board is detected, the verification unit obtains keys of the at least two pieces of hardware carried on the board from the stored keys.

After obtaining the previously stored public keys of the SoC and the FPGA, the verification unit verifies, based on the public keys corresponding to the SoC and the FPGA, whether the binding relationship included in the binding relationship information is correct. If the binding relationship is correct, the keys corresponding to the SoC and the FPGA are used to respectively decrypt the ciphertexts obtained through encryption by the SoC and the FPGA, and whether the data obtained through decryption is consistent with the random number is verified. Then, the security of the SoC and the FPGA is determined based on the verification result. If the binding relationship is implemented in a form of a certificate, the notarization certificate includes not only the binding relationship but also a digital signature obtained after the binding relationship is signed. The digital signature is signed by the certificate authority by using the private key of the certificate authority. In this case, the verification unit verifies, based on the digital signature in the notarization certificate, whether the binding relationship included in the binding relationship information is correct. For example, the verification unit uses a public key of the certificate authority to verify the digital signature in the notarization certificate. If the verification succeeds, the binding relationship is correct. If the verification fails, the binding relationship is incorrect.

For example, when the verification result is that the binding relationship included in the binding relationship information is correct, and the data obtained through decryption is consistent with the random number, it is determined that the SoC and the FPGA are secure. For example, when the verification result is that the binding relationship included in the binding relationship information is incorrect, or the data obtained through decryption is consistent with the random number, it may be determined that the SoC and the FPGA on the board are insecure, a security risk may exist, and corresponding exception handling may be performed. For example, the verification unit sends an alarm, or the verification unit sends prompt information to a display device, to indicate that the hardware on the board has a security risk. Another manner of exception handling may be alternatively used. This is not limited in this embodiment of this application.

In conclusion, according to the method provided in this embodiment of this application, the security of the SoC and the FPGA is verified based on the binding relationship between the SoC and the FPGA that are carried on the board and the ciphertexts obtained through encryption by the SoC and the FPGA by using the respective keys of the SoC and the FPGA such that attack behaviors such as replacement and counterfeiting can be prevented from occurring on the SoC and the FPGA.

Figure 10:
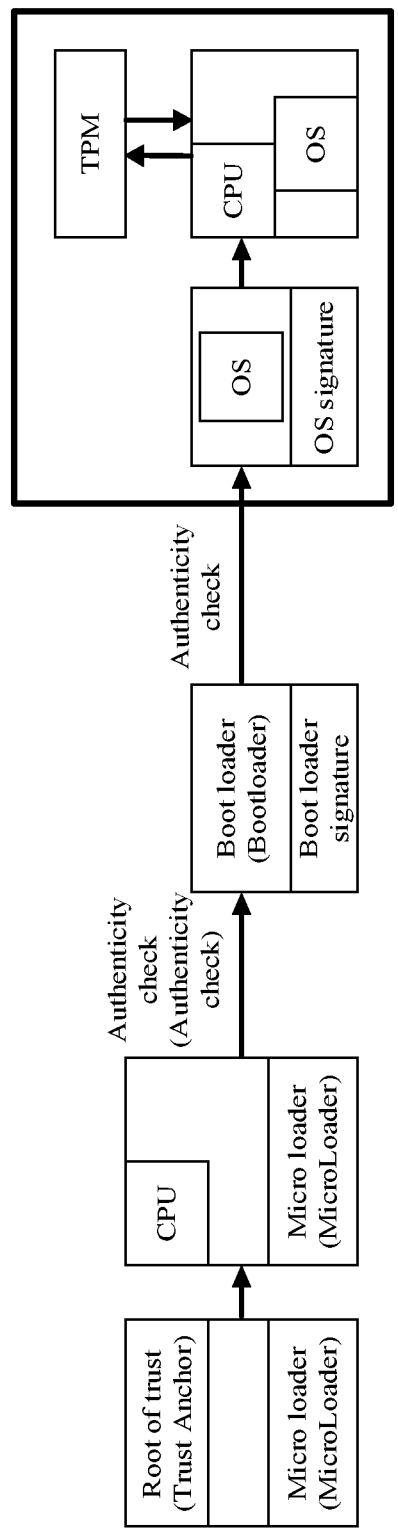
FIG. 10 is a schematic diagram of a process of hardware detection in a related technology according to an embodiment of this application.

For the scenario of protecting the hardware root of trust, a manner of detecting hardware based on a hardware identifier is proposed in a related technology. For example, as shown in FIG. 10, after a device is powered on, a secure boot service procedure is first executed to ensure integrity of boot software, and then authenticity of a hardware TPM is verified by a trusted software operating system (OS). The OS verifies a unique ID of a TPM security chip, and determines a certificate legally held by the TPM security chip. In this manner, authenticity of the TPM security module is determined. In other words, in the related technology, software integrity is ensured through secure boot, and hardware authenticity is ensured through trusted software. However, in a limitation, a solution provided in the related technology only ensures TPM authenticity, but does not have a binding relationship between hardware, does not have a defense capability for an attack scenario in which another piece of hardware in a board is replaced, and also does not have a defense capability for an attack scenario in which another piece of hardware is counterfeited.

According to the method provided in this embodiment of this application, the ciphertexts are obtained by performing encryption by using the keys, and integrity protection is performed on the hardware on the board based on verification of the ciphertexts, to effectively prevent the hardware on the board from being counterfeited or replaced. In addition, binding between the plurality of pieces of hardware further prevents the hardware from being counterfeited or replaced. In addition, in the method provided in this embodiment of this application, the binding relationship may be in the form of a certificate, and may be compatible with standard TCG authentication protocols, and the binding relationship between hardware can be extended in the protocols while a TCG standard authentication requirement is complied with. In this way, the binding relationship has strong practicability. In addition, in the method provided in this embodiment of this application, keys may be generated by using hardware IDs such that security features such as the hardware IDs and secure storage of the hardware are fully used, thereby improving security. Therefore, the method provided in this embodiment of this application has a capability of reliably ensuring hardware authenticity that is in delivery and in running on a live network and that is of a board used as a product.

Figure 11:
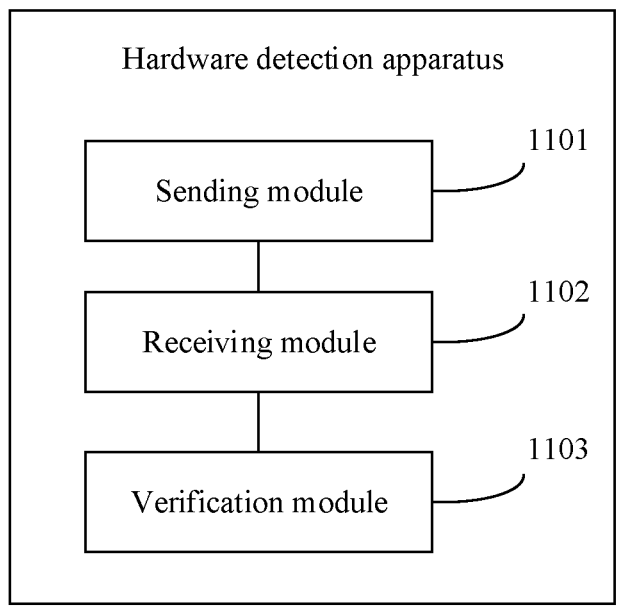
FIG. 11 is a schematic diagram of a structure of a hardware detection apparatus according to an embodiment of this application.

Refer to FIG. 11. An embodiment of this application provides a hardware detection apparatus. The apparatus may perform a verification process performed by the foregoing verification unit. The apparatus includes a sending module 1101 configured to send first verification data to a physical carrier, where the physical carrier carries a plurality of pieces of hardware; a receiving module 1102 configured to receive a ciphertext and binding relationship information that are returned by the physical carrier, where the ciphertext is obtained after at least two of the plurality of pieces of hardware respectively encrypt the first verification data by using respective keys, and the binding relationship information is used to indicate a binding relationship between the at least two pieces of hardware; and a verification module 1103 configured to verify the ciphertext and the binding relationship information, and determine security of the at least two pieces of hardware based on a verification result.

In an example embodiment, the binding relationship information includes a binding relationship between the keys corresponding to the at least two pieces of hardware; and the verification module 1103 is configured to obtain the keys corresponding to the at least two pieces of hardware, and verify, based on the keys corresponding to the at least two pieces of hardware, whether the binding relationship included in the binding relationship information is correct; and use the keys corresponding to the at least two pieces of hardware to respectively decrypt the ciphertext obtained through encryption by the at least two pieces of hardware, and verify whether the second verification data obtained through decryption is consistent with the first verification data; and when the verification result is that the binding relationship included in the binding relationship information is correct, and the second verification data obtained through decryption is consistent with the first verification data, determine that the at least two pieces of hardware are secure.

In an example embodiment, the receiving module 1102 is configured to receive the ciphertext and a notarization certificate that are returned by the physical carrier, where the notarization certificate includes a binding relationship between the keys corresponding to the at least two pieces of hardware, and further includes a digital signature of the binding relationship; and the verification module 1103 is configured to verify, based on the digital signature in the notarization certificate, whether the binding relationship included in the binding relationship information is correct; use the keys corresponding to the at least two pieces of hardware in the notarization certificate to respectively decrypt the ciphertext obtained through encryption by the at least two pieces of hardware, and verify whether second verification data obtained through decryption is consistent with the first verification data; and when the verification result is that the binding relationship included in the binding relationship information is correct, and the second verification data obtained through decryption is consistent with the first verification data, determine that the at least two pieces of hardware are secure.

In an example embodiment, the keys corresponding to the at least two pieces of hardware are generated by the at least two pieces of hardware respectively based on respective hardware identifiers.

In an example embodiment, the hardware identifier includes an HUK, a PUF, and identification information or an EK in confidentiality-protected OTP.

In an example embodiment, the key includes a symmetric key or an asymmetric key.

In an example embodiment, when the key is an asymmetric key, the key includes a public key and a private key; and the ciphertext is obtained after the at least two pieces of hardware respectively encrypt the first verification data by using respective private keys, and the binding relationship information is obtained based on a binding relationship between public keys corresponding to the at least two pieces of hardware.

Figure 12:
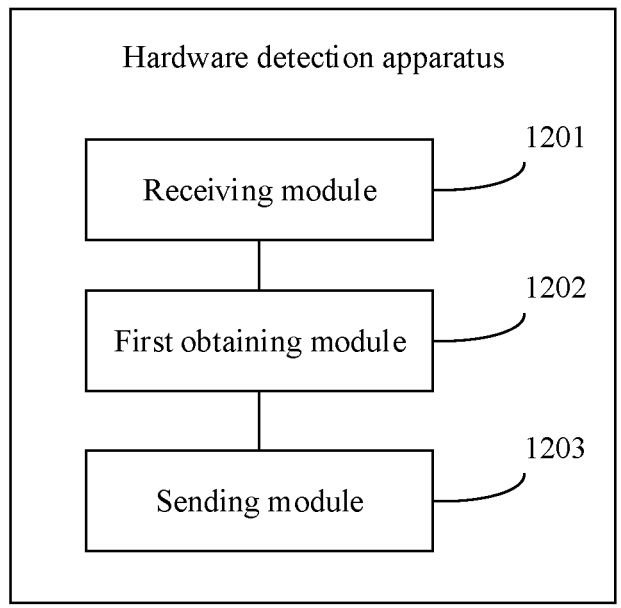
FIG. 12 is a schematic diagram of a structure of a hardware detection apparatus according to an embodiment of this application.

Refer to FIG. 12. An embodiment of this application provides a hardware detection apparatus. The apparatus may perform a function of the foregoing physical carrier. The apparatus includes a receiving module 1201 configured to receive first verification data sent by a verification unit; a first obtaining module 1202 configured to obtain a ciphertext and binding relationship information, where the ciphertext is obtained after at least two of a plurality of pieces of hardware carried on a physical carrier respectively encrypt the first verification data by using respective keys, and the binding relationship information is used to indicate a binding relationship between the at least two pieces of hardware; and a sending module 1203 configured to send the ciphertext and the binding relationship information to the verification unit, where the verification unit verifies the ciphertext and the binding relationship information, and determines security of the at least two pieces of hardware based on a verification result.

Figure 13:
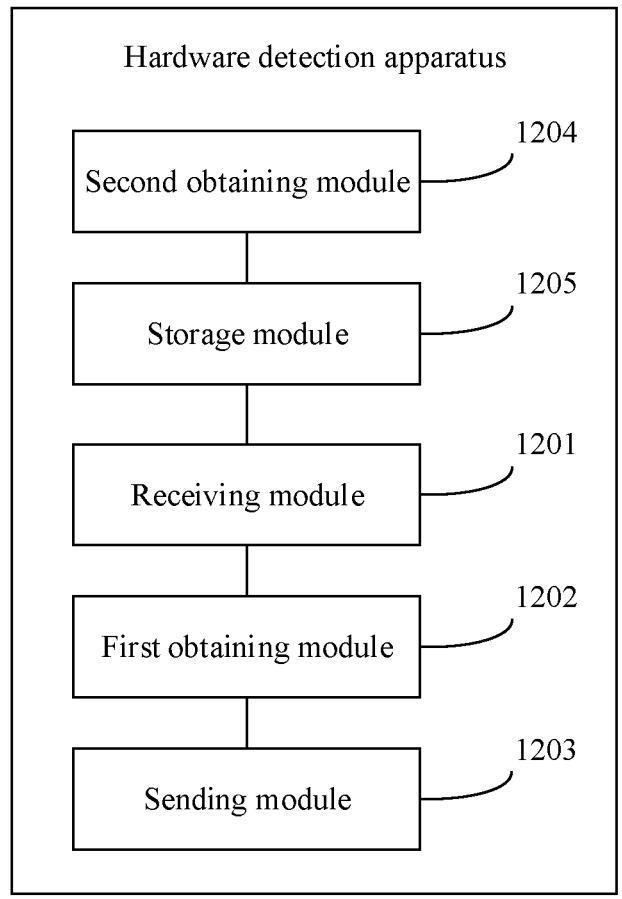
FIG. 13 is a schematic diagram of a structure of a hardware detection apparatus according to an embodiment of this application.

In an example embodiment, refer to FIG. 13. The apparatus further includes a second obtaining module 1204 configured to obtain the keys of the at least two pieces of hardware, and obtain the binding relationship information based on a binding relationship between the keys of the at least two pieces of hardware; and a storage module 1205 configured to store the binding relationship information.

In an example embodiment, the second obtaining module 1204 is configured to register the keys of the at least two pieces of hardware to obtain a notarization certificate, where the notarization certificate includes the binding relationship between the keys corresponding to the at least two pieces of hardware, and further includes a digital signature of the binding relationship; the storage module 1205 is configured to store the notarization certificate; and the first obtaining module 1202 is configured to obtain the notarization certificate.

In an example embodiment, the keys corresponding to the at least two pieces of hardware are generated by the at least two pieces of hardware respectively based on respective hardware identifiers.

In an example embodiment, the hardware identifier includes an HUK, a PUF, and identification information or an EK in confidentiality-protected OTP.

In an example embodiment, the key includes a symmetric key or an asymmetric key.

In an example embodiment, when the key is an asymmetric key, the key includes a public key and a private key. The ciphertext is obtained after the at least two pieces of hardware respectively encrypt the first verification data by using respective private keys. The binding relationship information is obtained based on a binding relationship between public keys corresponding to the at least two pieces of hardware.

It should be understood that, when the apparatus provided in the foregoing implements the functions of the apparatus, division into the foregoing functional modules is merely used as an example for description. During an application, the foregoing functions may be allocated to different functional modules for implementation based on a requirement. In other words, a device is divided into different functional modules in terms of an inner structure, to implement all or a part of the functions described above. In addition, the apparatus in the foregoing embodiment and the method embodiments are based on a same concept. For an implementation process, refer to the method embodiments, and details are not described herein again.

Figure 14:
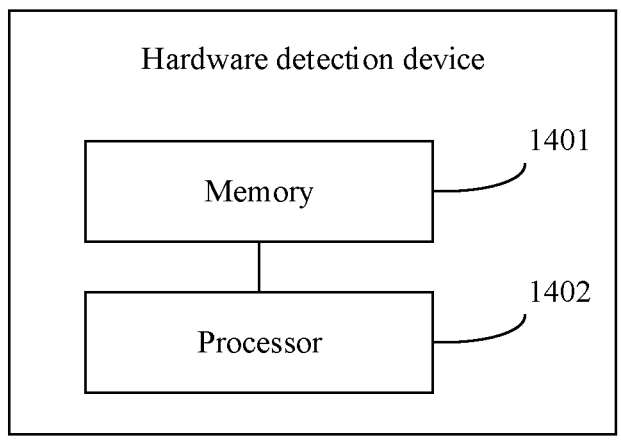
FIG. 14 is a schematic diagram of a structure of a hardware detection device according to an embodiment of this application.
Figure 15:
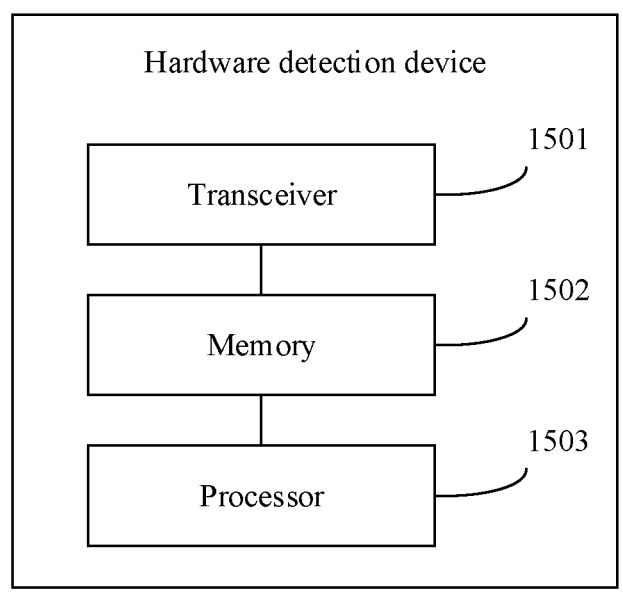
FIG. 15 is a schematic diagram of a structure of a hardware detection device according to an embodiment of this application.

Based on the same concept, an embodiment of this application further provides a hardware detection device. Refer to FIG. 14. The device includes a memory 1401 and a processor 1402. The memory 1401 stores at least one instruction, and the at least one instruction is loaded and executed by the processor 1402, to implement any one of the foregoing hardware detection methods provided in the embodiments of this application.

An embodiment of this application further provides a hardware detection device, including a transceiver 1501, a memory 1502, and a processor 1503. The memory 1502 and the processor 1503 communicate with each other through an internal connection path. The memory 1502 is configured to store instructions. The processor 1503 is configured to execute the instructions stored in the memory, to control the transceiver 1501 to receive a signal and control the transceiver 1501 to send a signal. In addition, when the processor 1503 executes the instructions stored in the memory 1502, the processor 1503 is enabled to perform any one of the foregoing hardware detection methods.

An embodiment of this application further provides a hardware detection system. The system includes the hardware detection apparatus shown in FIG. 11 and the hardware detection apparatus shown in FIG. 12 or FIG. 13.

An embodiment of this application further provides a computer-readable storage medium. The storage medium stores at least one instruction, and the instruction is loaded and executed by a processor, to implement any one of the foregoing hardware detection methods provided in the embodiments of this application.

An embodiment of this application further provides a chip, including a processor. The processor is configured to invoke, from a memory, and run instructions stored in the memory such that a communication device in which the chip is installed performs any one of the foregoing hardware detection methods.

An embodiment of this application further provides a chip, including an input interface, an output interface, a processor, and a memory. The input interface, the output interface, the processor, and the memory are connected through an internal connection path. The processor is configured to execute code in the memory. When the code is executed, the processor is configured to perform any one of the foregoing hardware detection methods.

It should be understood that the processor may be a central processing unit (CPU), or may be another general-purpose processor, a digital signal processor (DSP), an application-specific integrated circuit (ASIC), a field-programmable gate array (FPGA) or another programmable logic device, a discrete gate or transistor logic device, or a discrete hardware component, or the like. The general-purpose processor may be a microprocessor, any conventional processor, or the like. It should be noted that the processor may be a processor that supports an advanced reduced instruction set computing machines (advanced RISC machines (ARM)) architecture.

Further, in an optional embodiment, there are one or more processors, and there are one or more memories. Optionally, the memory may be integrated with the processor, or the memory and the processor are separately disposed. The memory may include a read-only memory (ROM) and a random access memory (RAM), and provide instructions and data to the processor. The memory may further include a nonvolatile random access memory (NVRAM). For example, the memory may further store information about a device type.

The memory may be a volatile memory or a nonvolatile memory, or may include both a volatile memory and a nonvolatile memory. The nonvolatile memory may be a ROM, a programmable read-only memory (PROM), an erasable programmable read-only memory (EPROM), an electrically erasable programmable read-only memory (EEPROM), or a flash memory. The volatile memory may be a RAM that is used as an external cache. For example, but not limitation, many forms of RAMs are available, for example, a static random-access memory (SRAM), a dynamic random access memory (DRAM), a synchronous dynamic random-access memory (SDRAM), a double data rate (DDR) synchronous dynamic random-access memory (DDR SDRAM), an enhanced synchronous dynamic random-access memory (ESDRAM), a synchlink dynamic random-access memory (SLDRAM), and a direct Rambus (DR) random-access memory (DR RAM).

This application provides a computer program. When the computer program is executed by a computer, a processor or the computer is enabled to perform corresponding steps and/or procedures in the foregoing method embodiments.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, the procedures or functions according to this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, including one or more usable media that are integrated. The usable medium may be a magnetic medium (for example, a floppy disk, a hard disk drive, or a magnetic tape), an optical medium (for example, a DVD), a semiconductor medium (for example, a solid-state drive (SSD)), or the like.

The foregoing descriptions are merely implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A method, comprising:
sending, to a physical carrier, first verification data;
receiving, from the physical carrier, ciphertext information and binding relationship information responsive to sending the first verification data, wherein the ciphertext information comprises a first ciphertext and a second ciphertext, wherein the first ciphertext is from a first hardware component of the physical carrier encrypting the first verification data with a first key of the first hardware component, wherein the second ciphertext is from a second hardware component of the physical carrier encrypting the first verification data with a second key of the second hardware component, and wherein the binding relationship information indicates a binding relationship between the first hardware component and the second hardware component based on the first key and the second key;
verifying the ciphertext information and the binding relationship information to obtain a verification result; and
verifying a security of the first hardware component and the second hardware component based on the verification result.

2. The method of claim 1, wherein verifying the ciphertext information and the binding relationship information comprises:
obtaining the first key and the second key;
verifying, based on the first key and the second key, whether the binding relationship is correct;
using the first key and the second key to decrypt the ciphertext information responsive to verifying the binding relationship being correct; and
verifying whether second verification data based on decryption of the ciphertext information is consistent with the first verification data, and
wherein verifying the security comprises verifying that the first hardware component and the second hardware component are secure when the verification result indicates that the binding relationship is correct and the second verification data is consistent with the first verification data.

3. The method of claim 1, wherein receiving the ciphertext information and the binding relationship information comprises receiving, from the physical carrier, the ciphertext information and a notarization certificate, wherein the notarization certificate comprises a digital signature of the binding relationship, wherein verifying the ciphertext information comprises:
verifying, based on the digital signature in the notarization certificate, whether the binding relationship comprised in the binding relationship information is correct;
respectively decrypting the ciphertext information using the first key and the second key that correspond to the first hardware component and the second hardware component respectively in the notarization certificate to obtain second verification data; and
verifying whether the second verification data is consistent with the first verification data, and
wherein verifying the security comprises verifying that the first hardware component and the second hardware component are secure, wherein the verification result indicates that the binding relationship comprised in the binding relationship information is correct and the second verification data is consistent with the first verification data.

4. The method of claim 1, wherein the first key and the second key correspond to the first hardware component and the second hardware component and are based on hardware identifiers.

5. The method of claim 4, wherein each of the hardware identifiers comprises a hardware unique key (HUK), a physical unclonable function (PUF), and identification information or an endorsement key (EK) in confidentiality-protected one-time programmable (OTP).

6. The method of claim 1, wherein each of the first key and the second key comprises a symmetric key or an asymmetric key.

7. The method of claim 6, wherein each of the first key and the second key is an asymmetric key and comprises a public key and a private key, wherein the ciphertext information is based on respective encrypted data of the first verification data with private keys from the first hardware component and the second hardware component, and wherein the binding relationship information is based on a binding relationship between public keys that correspond to the first hardware component and the second hardware component.

8. An apparatus comprising:
one or more processors; and
a memory coupled to the one or more processors and configured to store instructions that when executed by the one or more processors cause the apparatus to:
receive first verification data from a verification apparatus;
encrypt, responsive to receiving the first verification data, the first verification data by a first hardware component and a second hardware component on a physical carrier using a first key and a second key that correspond to the first hardware component and the second hardware component respectively;
obtain ciphertext information and binding relationship information, wherein the ciphertext information comprises a first ciphertext and a second ciphertext, wherein the first ciphertext is from the first hardware component encrypting the first verification data with the first key of the first hardware component, wherein the second ciphertext is from the second hardware component of the physical carrier encrypting the first verification data with the second key of the second hardware component, and wherein the binding relationship information is obtained responsive to encrypting the first verification data, wherein the binding relationship information indicates a binding relationship between the first hardware component and the second hardware component; and
send the ciphertext information and the binding relationship information to the verification apparatus to permit the verification apparatus to verify the ciphertext information and the binding relationship information and to permit the verification apparatus to verify security of the first hardware component and the second hardware component based on verifying the ciphertext information and the binding relationship information.

9. The apparatus of claim 8, wherein when executed by the one or more processors, the instructions further cause the apparatus to:
obtain the first key and the second key;
obtain the binding relationship information based the first key and the second key; and
store the binding relationship information.

10. The apparatus of claim 9, wherein when executed by the one or more processors, the instructions further cause the apparatus to:
register the first key and the second key to obtain a notarization certificate; and
store the notarization certificate, wherein the notarization certificate comprises the binding relationship between the first key and the second key and further comprises a digital signature of the binding relationship, and wherein the binding relationship information comprises the notarization certificate.

11. The apparatus of claim 8, wherein when executed by the one or more processors, the instructions further cause the apparatus to generate the first key and the second key based on respective hardware identifiers.

12. The apparatus of claim 11, wherein each of the respective hardware identifiers comprises a hardware unique key (HUK), a physical unclonable function (PUF), and identification information or an endorsement key (EK) in confidentiality-protected one-time programmable (OTP).

13. The apparatus of claim 8, wherein each of the first key and the second key comprises a symmetric key or an asymmetric key.

14. The apparatus of claim 13, wherein each of the first key and the second key is an asymmetric key and comprises a public key and a private key, and wherein the instructions further cause the apparatus to:
encrypt, by the first hardware component and the second hardware component respectively, the first verification data using private keys; and
obtain the ciphertext information responsive to encrypting the first verification data, and wherein the binding relationship information is based on a binding relationship between public keys that correspond to the first hardware component and the second hardware component respectively.

15. An apparatus, comprising:
one or more processors; and
a memory coupled to the one or more processors and configured to store instructions that when executed by the one or more processors cause the apparatus to:
send, to a physical carrier, first verification data;
receive, from the physical carrier, ciphertext information and binding relationship information responsive to sending the first verification data, wherein the ciphertext information comprises a first ciphertext and a second ciphertext, wherein the first ciphertext is from a first hardware component of the physical carrier encrypting the first verification data with a first key of the first hardware component, wherein the second ciphertext is from a second hardware component of the physical carrier encrypting the first verification data with a second key of the second hardware component, and wherein the binding relationship information indicates a binding relationship between the first hardware component and the second hardware component based on the first key and the second key;
verify the ciphertext information and the binding relationship information to obtain a verification result; and
verify a security of the first hardware component and the second hardware component based on the verification result.

16. The apparatus of claim 15, wherein when executed by the one or more processors, the instructions further cause the apparatus to:
obtain the first key and the second key;
verify, based on the first key and the second key, whether the binding relationship is correct;
use the first key and the second key to respectively decrypt the ciphertext information responsive to verifying the binding relationship being correct;
verify whether second verification data obtained through decryption of the ciphertext information is consistent with the first verification data; and
verify that the first hardware component and the second hardware component are secure when the verification result indicates that the binding relationship is correct and the second verification data is consistent with the first verification data.

17. The apparatus of claim 15, wherein when executed by the one or more processors, the instructions further cause the apparatus to:

receive, from the physical carrier, the ciphertext information and a notarization certificate, wherein the notarization certificate comprises a digital signature of the binding relationship;

verify, based on the digital signature in the notarization certificate, whether the binding relationship comprised in the binding relationship information is correct;

respectively decrypt the ciphertext information using the first key and the second key that correspond to the first hardware component and the second hardware component in the notarization certificate to obtain second verification data;

verify whether the second verification data is consistent with the first verification data; and verify that the first hardware component and the second hardware component are secure, wherein the verification result indicates that the binding relationship comprised in the binding relationship information is correct and the second verification data is consistent with the first verification data.

18. The apparatus of claim 15, wherein the first key and the second key correspond to the first hardware component and the second hardware component and are based on hardware identifiers.

19. The apparatus of claim 18, wherein each of the hardware identifiers comprises a hardware unique key (HUK), a physical unclonable function (PUF), and identification information or an endorsement key (EK) in confidentiality-protected one-time programmable (OTP).

20. The apparatus of claim 15, wherein each of the first key and the second key comprises a symmetric key or an asymmetric key.

* * * * *